United States Patent
Kim et al.

(10) Patent No.: US 7,364,108 B2
(45) Date of Patent: Apr. 29, 2008

(54) CONNECTION STRUCTURE AND REEL

(76) Inventors: Mu-Joong Kim, Song-Won Apt. 1 dong 1305ho, 581-28, Pa-dong, Soosung-gu, Daegu 706-847 (KR); Mi-Kyung Lee, Song-Won Apt. 1 dong 1305ho, 581-28, Pa-dong, Soosung-gu, Daegu 706-847 (KR)

(*) Notice: Subject to any disclaimer, the term of this patent is extended or adjusted under 35 U.S.C. 154(b) by 0 days.

(21) Appl. No.: 11/596,442

(22) PCT Filed: Jan. 18, 2005

(86) PCT No.: PCT/KR2005/000166

§ 371 (c)(1),
(2), (4) Date: Nov. 13, 2006

(87) PCT Pub. No.: WO2005/115139

PCT Pub. Date: Dec. 8, 2005

(65) Prior Publication Data

US 2007/0221774 A1    Sep. 27, 2007

(30) Foreign Application Priority Data

May 14, 2004  (KR) .................... 10-2004-0034453
Dec. 20, 2004  (KR) .................... 10-2004-0108889

(51) Int. Cl.
*B65H 75/00* (2006.01)
(52) U.S. Cl. ................ 242/370; 242/323; 191/12.2 R; 439/19; 439/20; 439/22; 439/25; 439/26; 439/27; 439/29
(58) Field of Classification Search ................ 242/370, 242/223, 323; 439/17, 18, 19, 20, 21, 22, 439/23, 24, 25, 26, 27, 28, 29; 191/12.2 R
See application file for complete search history.

(56) References Cited

U.S. PATENT DOCUMENTS

| 2,325,805 | A | * | 8/1943 | Shoffner ................ 191/12.2 R |
| 2,751,565 | A | * | 6/1956 | Johnston ...................... 439/22 |
| 3,102,765 | A | * | 9/1963 | Newman ........................ 439/3 |
| 4,021,090 | A | * | 5/1977 | Fredericksen ................ 439/4 |

(Continued)

FOREIGN PATENT DOCUMENTS

EP    1 095 894 B1    2/2004

(Continued)

OTHER PUBLICATIONS

International Search Report; Application No. PCT/KR2005/000166; Date: Jun. 7, 2005.

(Continued)

*Primary Examiner*—Emmanuel M Marcelo
(74) *Attorney, Agent, or Firm*—Cantor Colburn LLP

(57) ABSTRACT

A contact structure in a cable winding reel is disclosed which maintains rotary contact between two cables connected, at one-side ends thereof, to electric/electronic appliances, namely, one cable which is wound on a rotating body, and the other cable which is maintained in a fixed state without being wound, thereby enabling transmission of electricity and signals between the cables. A cable winding reel is also disclosed, wherein the contact structure is implemented in a well-known cable winding reel structure.

19 Claims, 14 Drawing Sheets

U.S. PATENT DOCUMENTS

| | | | | |
|---|---|---|---|---|
| 4,102,445 A | * | 7/1978 | Eurom | 191/12.2 R |
| 4,138,177 A | * | 2/1979 | Van Valer | 439/4 |
| 5,261,514 A | * | 11/1993 | Evans | 191/12.2 R |
| 5,775,922 A | * | 7/1998 | Kilstrom | 439/23 |
| 6,048,211 A | * | 4/2000 | Liaom | 439/4 |
| 6,386,885 B1 | * | 5/2002 | Ford | 439/17 |
| 6,789,653 B1 | * | 9/2004 | Hsu et al. | 191/12.2 R |
| 6,908,310 B1 | * | 6/2005 | Olsson et al. | 439/26 |
| 7,131,844 B1 | * | 11/2006 | Wurr | 439/20 |

FOREIGN PATENT DOCUMENTS

| | | |
|---|---|---|
| JP | 9-255238 | 9/1997 |
| JP | 2001-130838 | 5/2001 |
| KR | 20-0197602 | 7/2000 |
| KR | 10-2004-0090043 | 10/2004 |
| WO | WO 03/026995 A2 | 4/2003 |

OTHER PUBLICATIONS

Concise explanation of relevance of IDS materials (2 pgs) for JP2001-130838; JP09-255238; KR20-0197602; KR10-2004-90043.

* cited by examiner

[Figure 1]
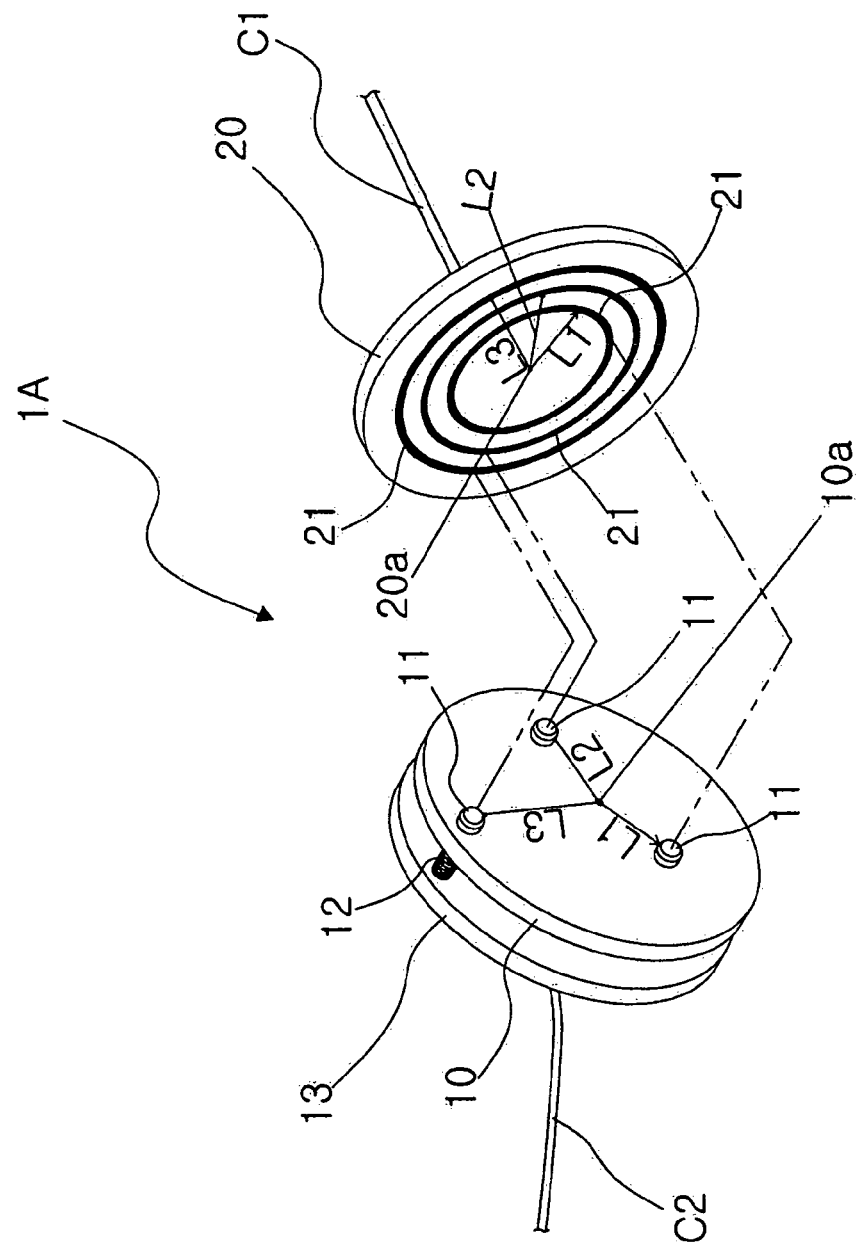

[Figure 2]
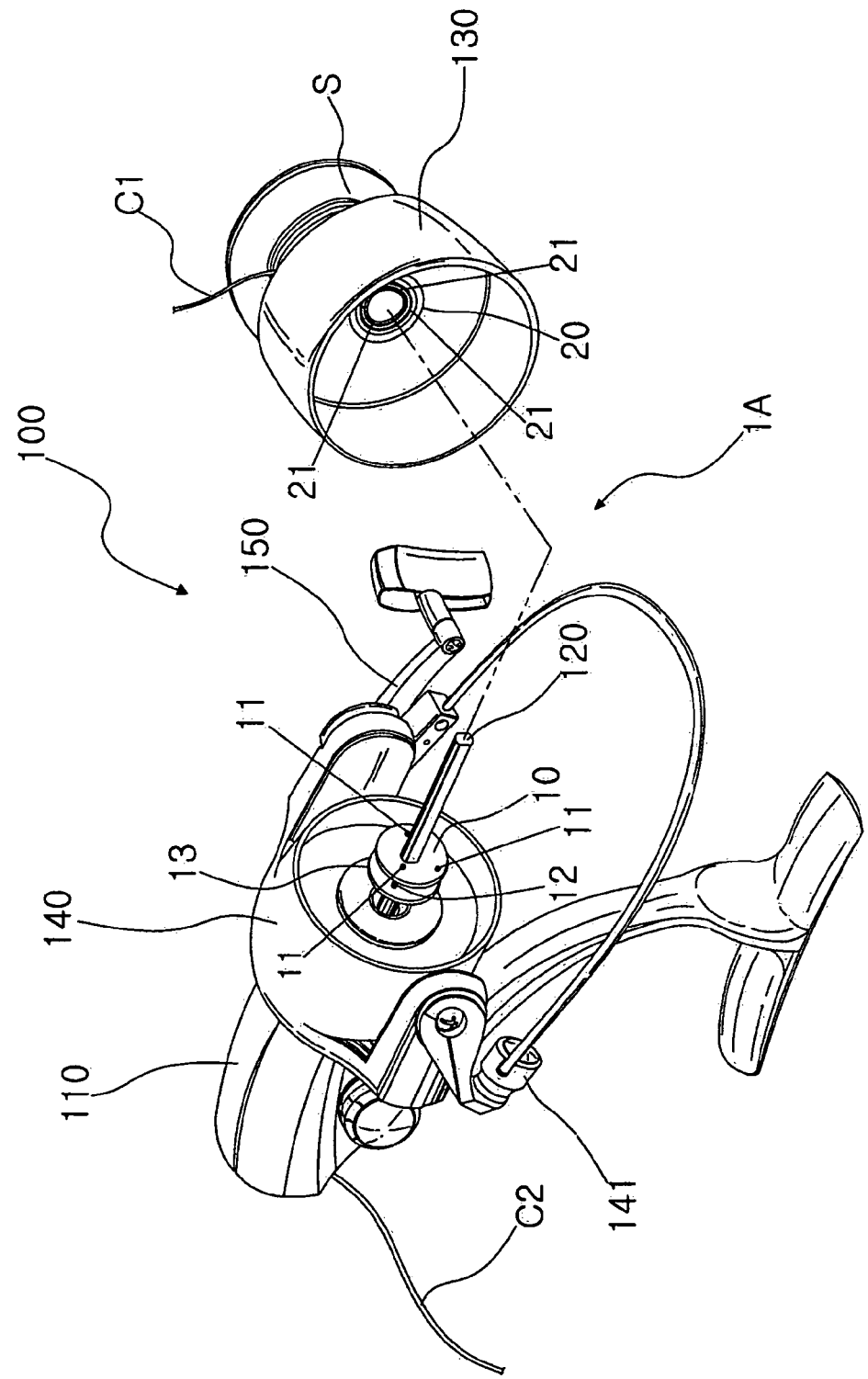

[Figure 3]
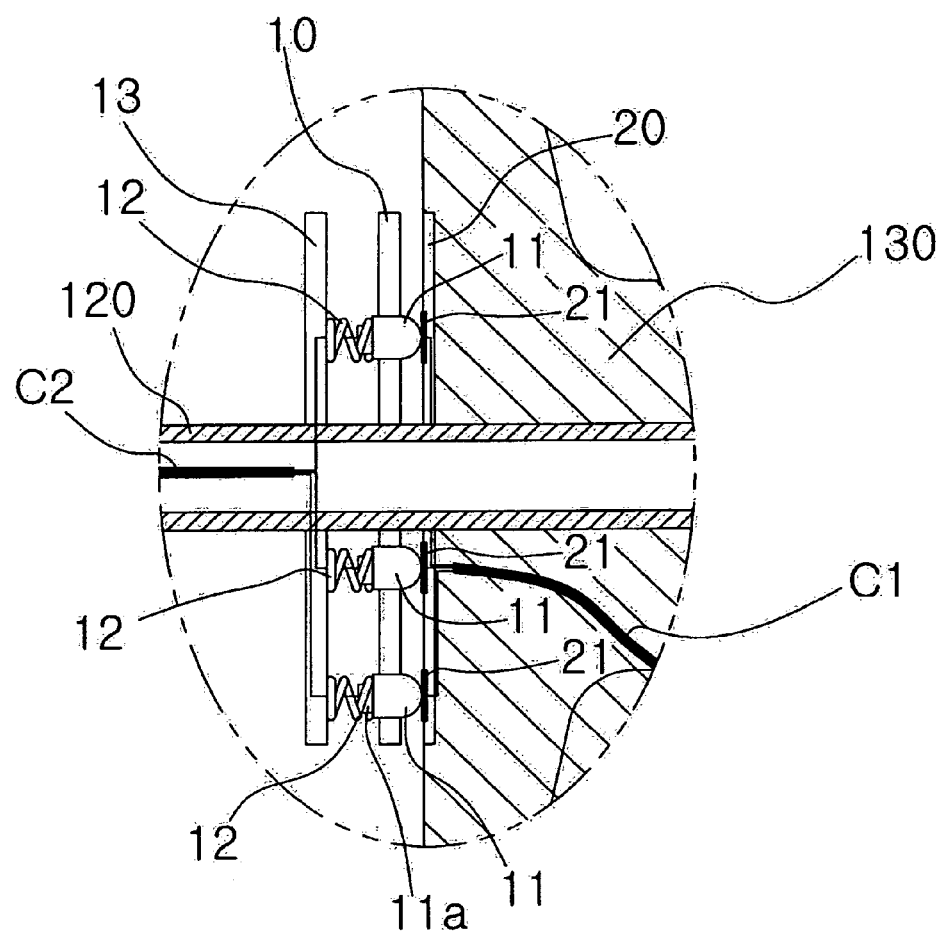

[Figure 4]
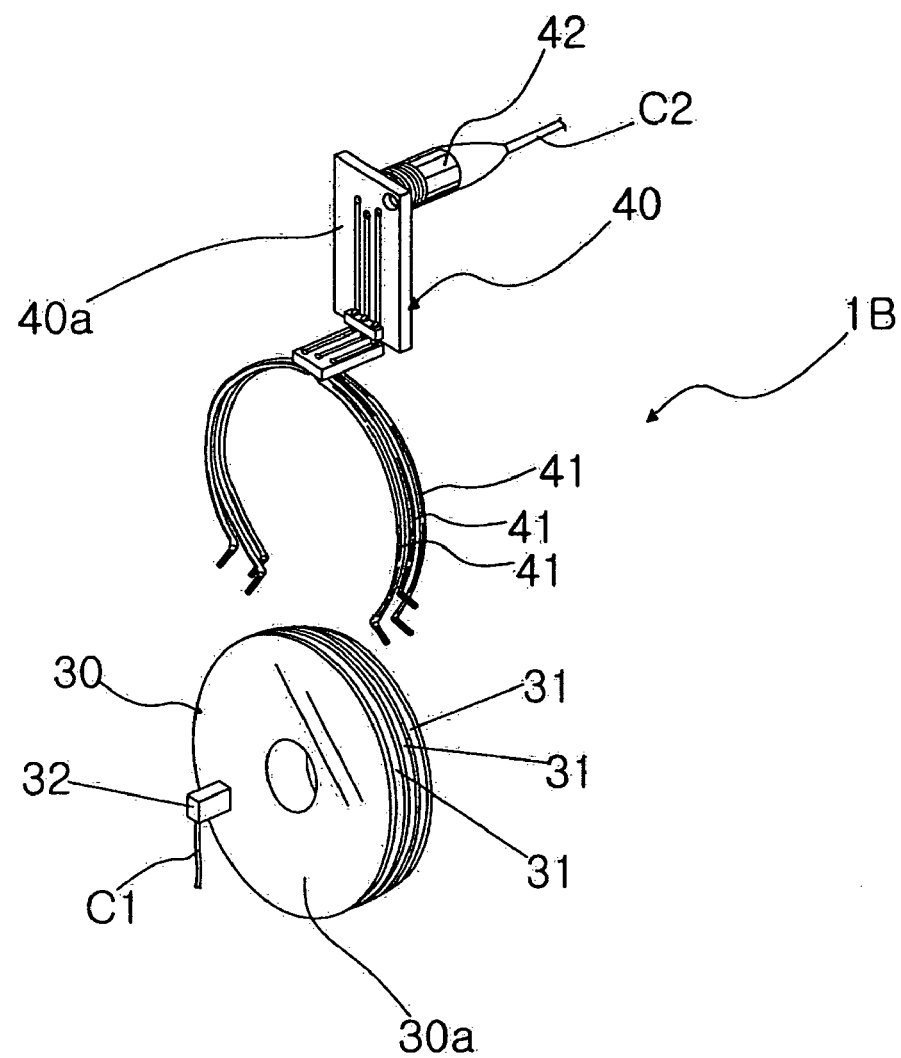

[Figure 5]
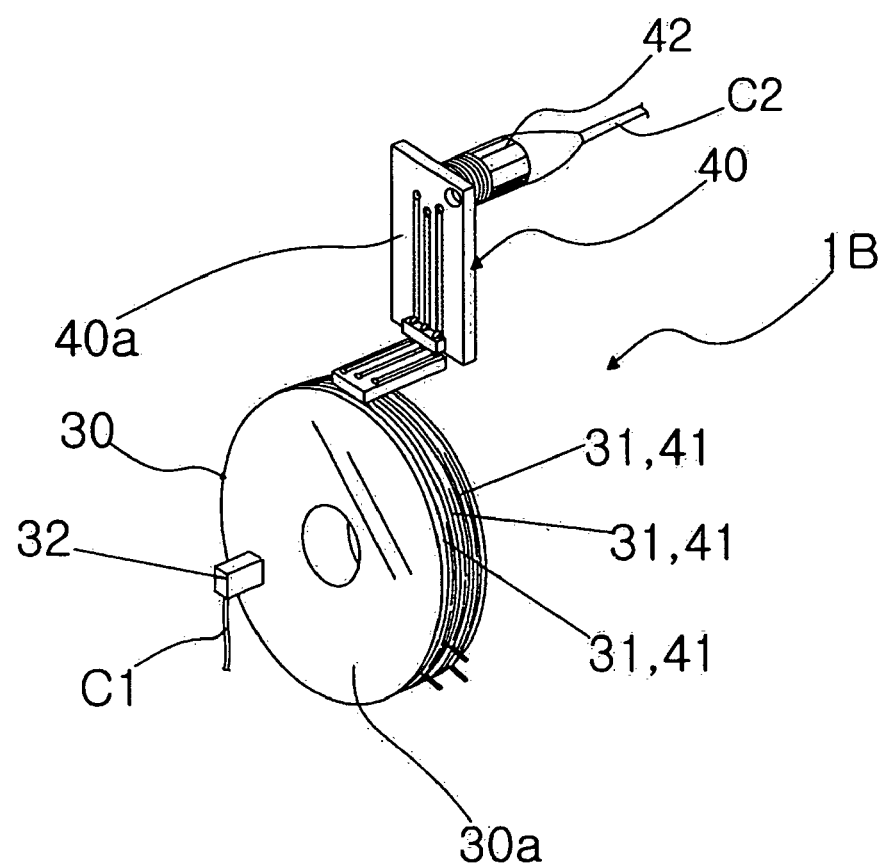

[Figure 6]
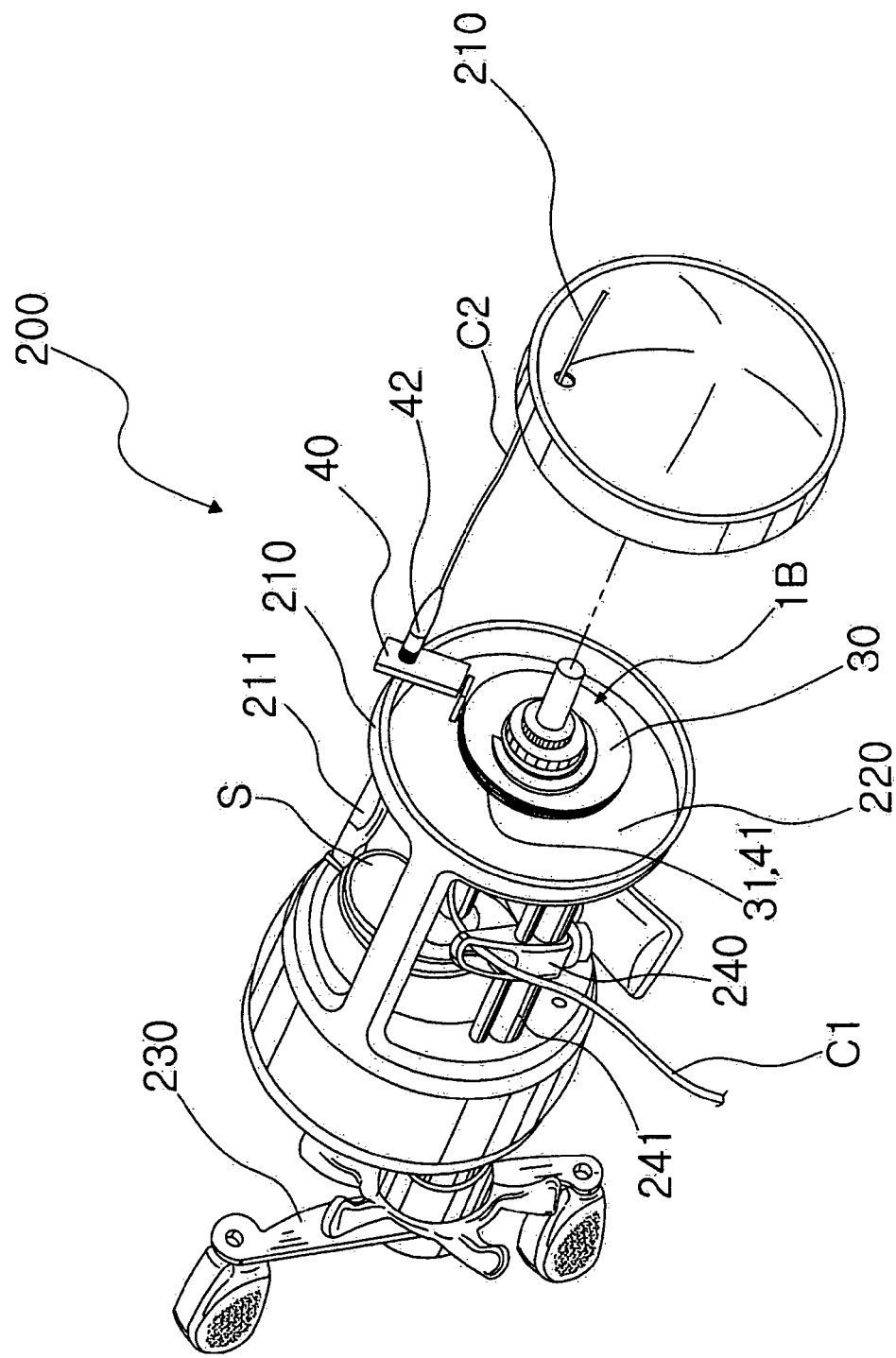

[Figure 7]
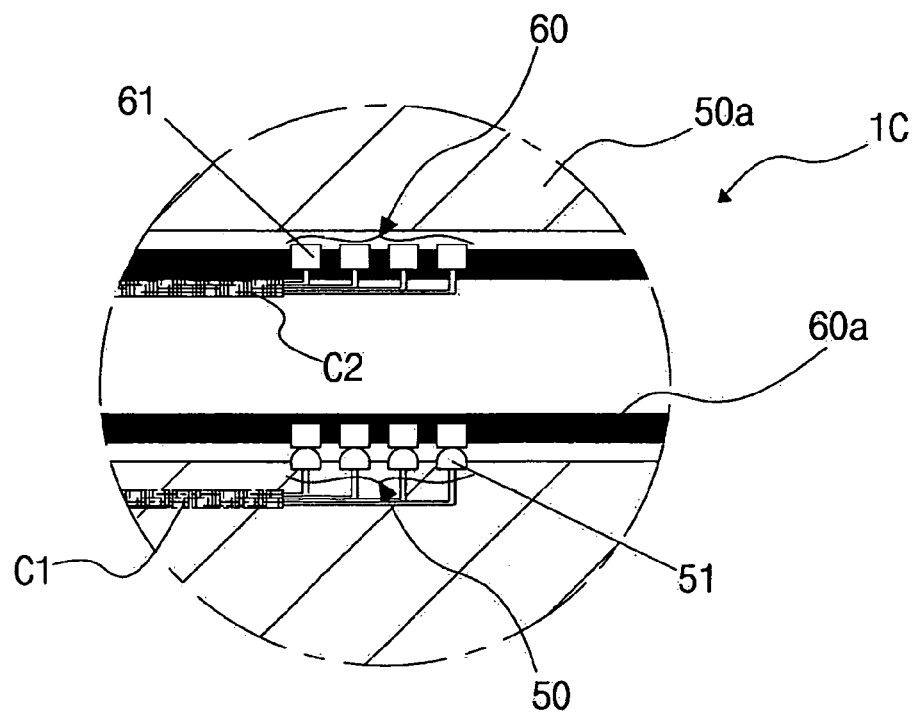
[Figure 8]
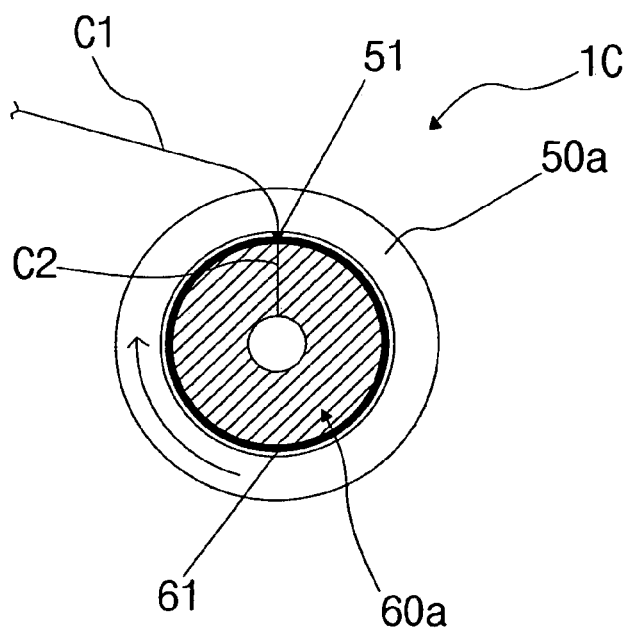

[Figure 9]
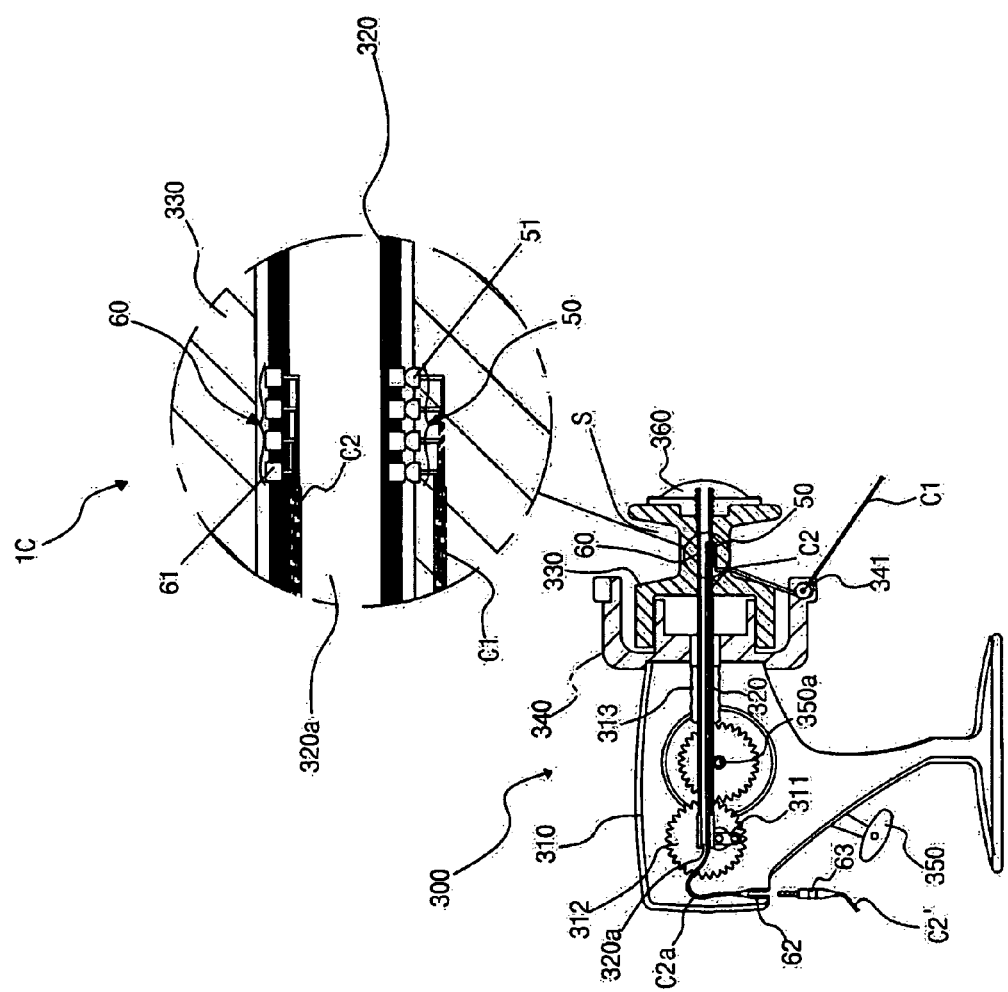

[Figure 10]
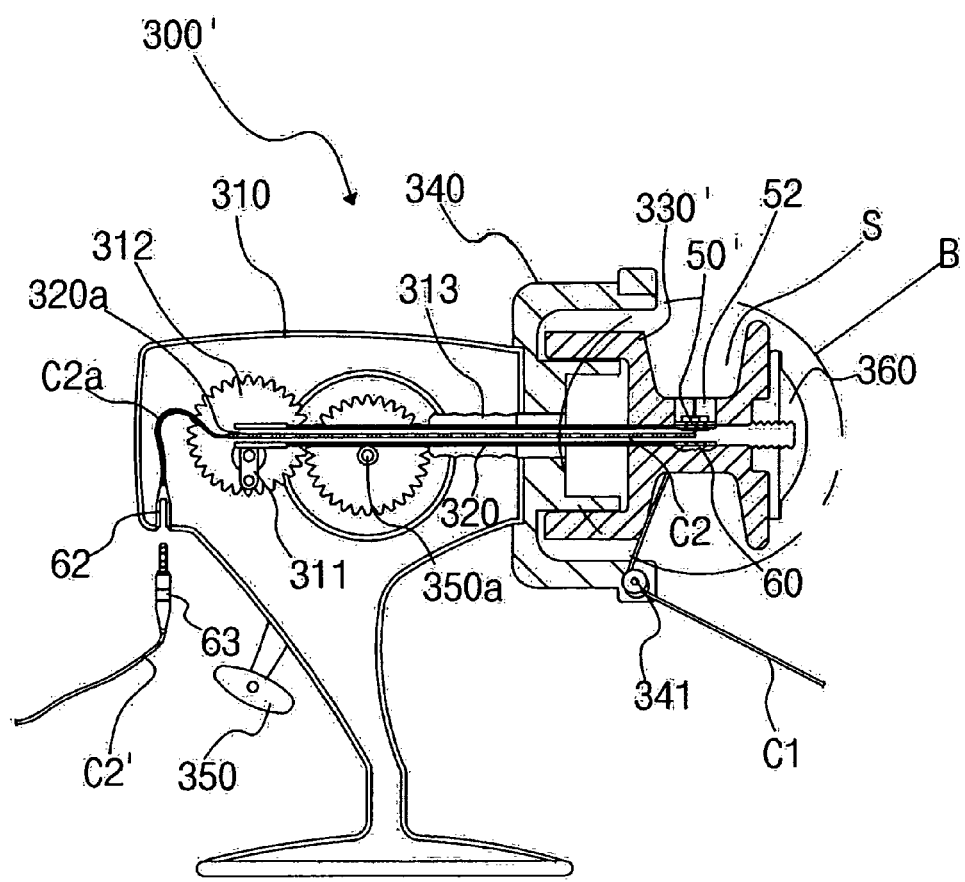

【Figure 11】
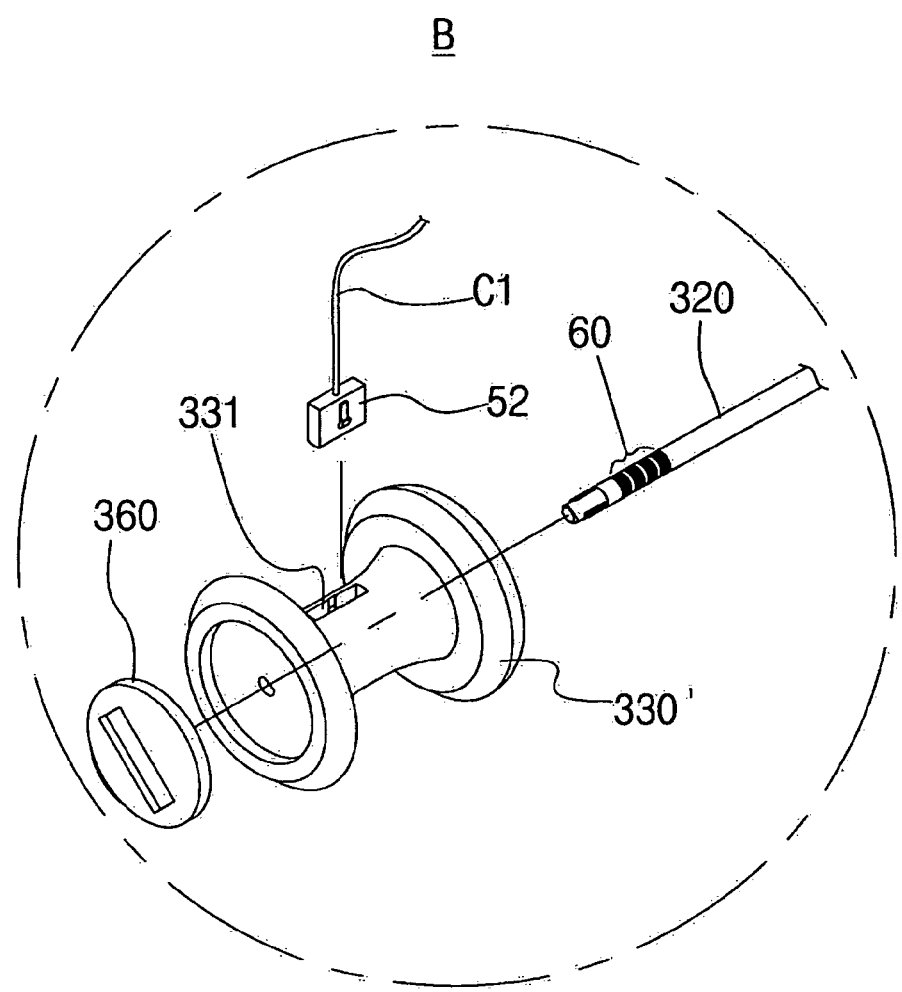

[Figure 12]
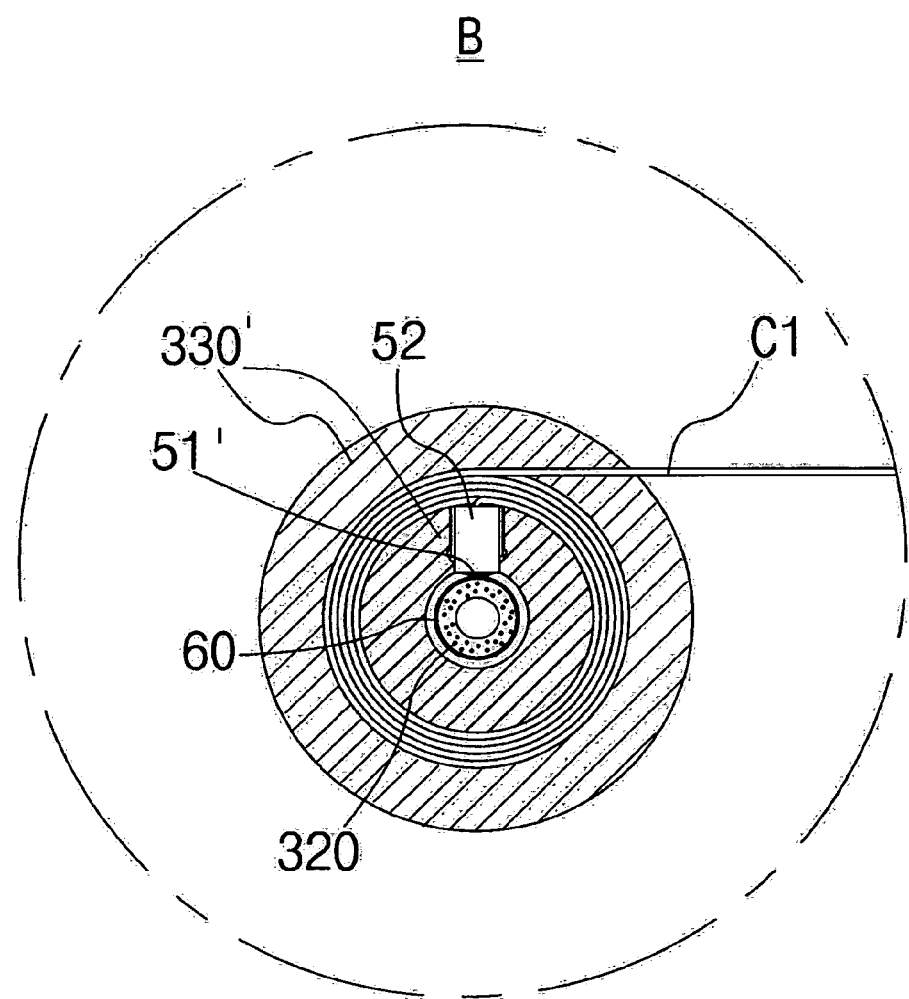

[Figure 13]
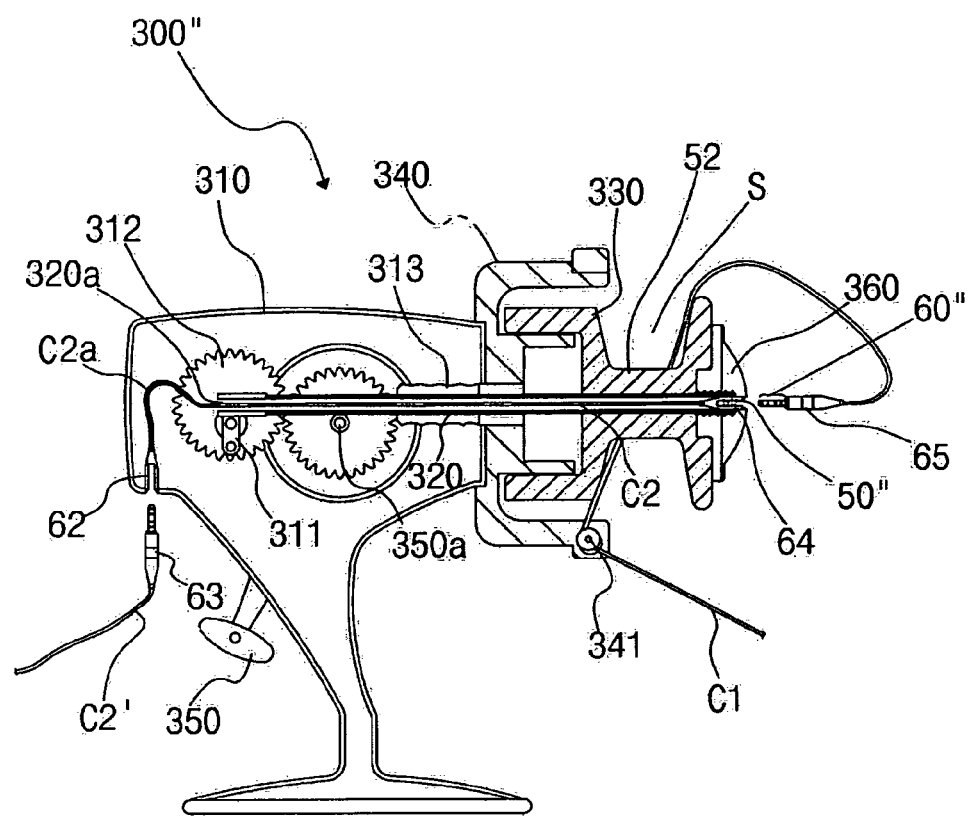

[Figure 14]
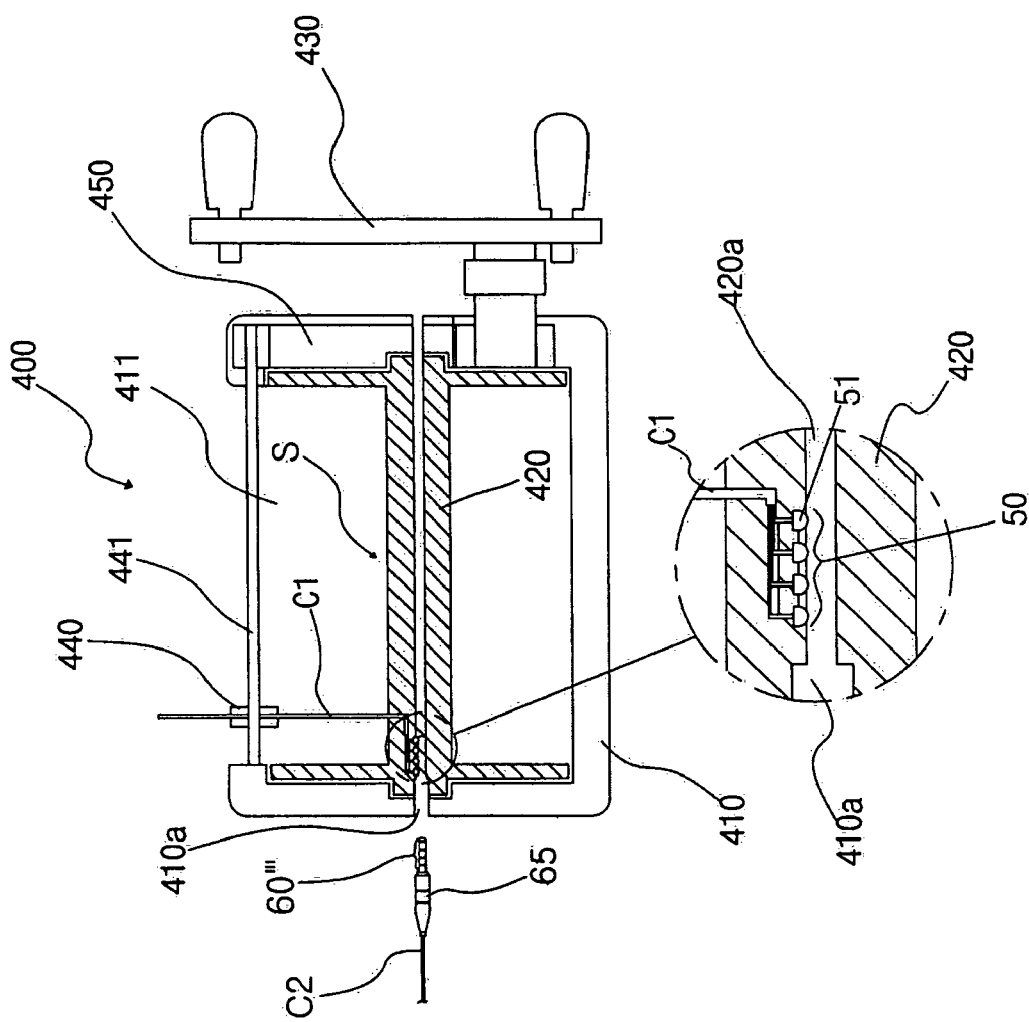

【Figure 15】
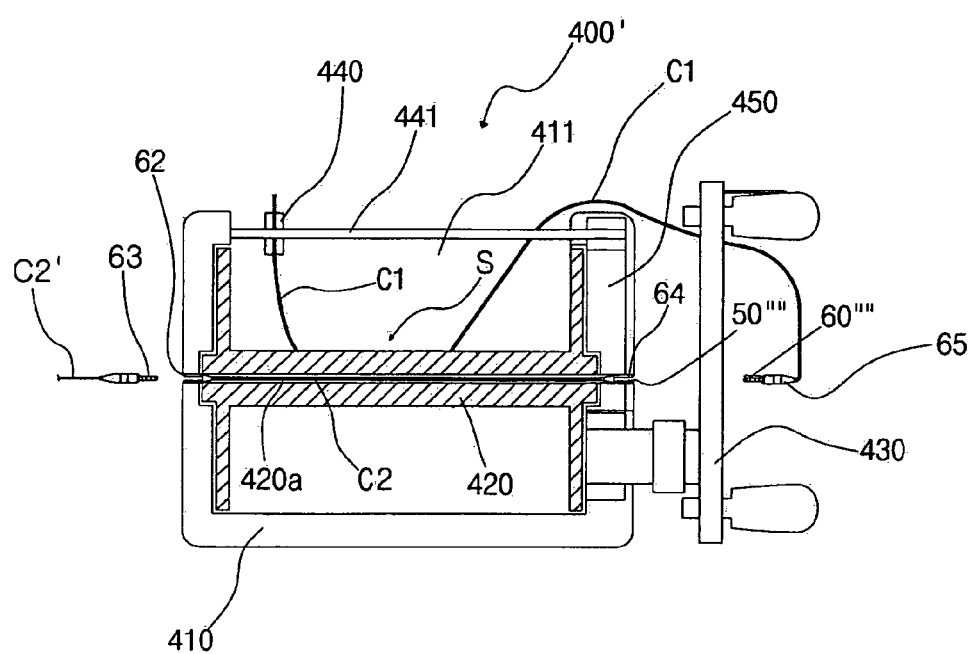

CONNECTION STRUCTURE AND REEL

TECHNICAL FIELD

The present invention relates to a contact structure for electrical connection in a cable winding reel, and a cable winding reel equipped with the same.

More particularly, the present invention relates to a rotary contact structure for electrical connection in a cable winding reel, which enables a selected one of two cables respectively connected, at one-side ends thereof, to electric/electronic appliances, to be wound on the cable winding reel without causing the selected cable to be twisted, while maintaining contact between the cables to enable stable transmission of electricity and signals between the electric/electronic appliances, and a cable winding reel wherein the contact structure is implemented in a well-known cable winding reel structure.

BACKGROUND ART

Recently, the inventors of the present invention proposed miniature imaging equipment and electronic measuring equipment for observing or measuring an underwater or underground environment and state. The inventors proposed a multi-function cable for use in such equipment. The multi-function cable has an integrated structure of several strands of signal lines and a power line.

Such equipment includes two separate devices. One device directly penetrates into the underwater or underground to perform an imaging or measuring operation. The other device is located on the surface of the water or on the ground, and is adapted to supply electric power to the imaging or measuring device, to control the imaging or measuring device, and to monitor the results of the control operation. The two devices are connected by the above-mentioned multi-function cable which is adapted to transmit electrical signals or other signals.

As an example of such equipment, there is a fishing apparatus equipped with an imaging system which includes a multi-function cable mounted to a fishing rod to be used as a fishing line, an imaging module coupled to a leading end of the multi-function cable, and internally provided with an underwater camera, the imaging module also serving as a weight, and a display module coupled to a trailing end of the multi-function cable, and internally provided with a battery to supply electric power and a control panel to control the imaging module located in the underwater. Using this fishing apparatus, the user can play fishing while monitoring an underwater image displayed on the display module. The multi-function cable may be wound on a reel mounted to the fishing rod, as in typical fishing equipment, so as to enable the user to fish while winding or unwinding the multi-function cable.

Conventionally, such a reel is configured to wind a fishing rod in accordance with rotation of a spool mounted to a reel body (bait cast reel), and to enable the user to rotate the spool through a desired angle while grasping the spool (spinning reel). Where this reel is applied, as it is, to the above-mentioned fishing apparatus, to wind the multi-function cable, there is a problem of twisting of the cable occurring between the display module and the spool during a cable winding operation due to the above-mentioned configuration of the reel.

When such twisting occurs repeatedly, the communication and electrical connection by the cable may become unstable. Also, overstress may be applied to the equipment, thereby degrading the durability of the equipment. Furthermore, it is troublesome for the user to handle the equipment.

DISCLOSURE

Technical Problem

Therefore, the present invention has been made in view of the above-mentioned problems, and it is a primary object of the present invention to provide a contact structure of a cable winding reel which is capable of maintaining an electrical connection state enabling stable transmission of signals and electricity between opposite ends of a cable wound on a reel, while enabling the cable to be easily wound on the reel without being twisted.

A secondary object of the present invention is to provide a cable winding reel provided with the contact structure for electrical connection in accordance with application of the contact structure thereto.

technical solution

In accordance with the present invention, the problems caused by twisting occurring in the above-mentioned convention cable winding reels are solved through the following contact structures with various configurations enabling transmission of signals and electricity between facing ends of a cable rotating during a winding operation and a fixed cable, and the following cable winding reels respectively equipped with the contact structures.

In accordance with a first aspect, the present invention provides a contact structure for electrical connection in a cable winding reel comprising:

a first cable connected to a rotating body which rotates during a cable winding operation;

a second cable connected to a fixed body which does not rotate during the cable winding operation;

a first base plate mounted to one of the rotating and fixed bodies, and provided with a plurality of terminal pins arranged on the first base plate and connected to one end of an associated one of the first and second cables, the terminal pins being spaced apart from a center of the first base plate by different distances, respectively; and a second base plate mounted to the other one of the rotating and fixed bodies, and provided with a plurality of annular terminals concentrically arranged on the second base plate and connected to one end of an associated one of the first and second cables, the annular terminals having radii corresponding to the spaced distances of the terminal pins, respectively, wherein the first and second base plates are concentrically arranged to face each other such that the terminal pins and the corresponding annular terminals come into contact with each other, whereby rotary contact is maintained between the terminal pins on the first base plate and the corresponding annular terminals on the second base plate, even during the cable winding operation to wind the first cable, thereby maintaining electrical connection for transmission of electricity or signals between the first and second cables.

In accordance with a second aspect, the present invention provides a contact structure for electrical connection in a cable winding reel comprising:

a first cable connected to a rotating body which rotates during a cable winding operation;

a second cable connected to a fixed body which does not rotate during the cable winding operation;

a rotary terminal structure provided at the rotating body, the rotary terminal structure comprising a wheel member mounted to the rotating body, and a plurality of peripheral terminals arranged on a periphery of the wheel member while being spaced apart from one another, the peripheral terminals being connected to one end of the first cable; and a fixed terminal structure provided at the fixed body, the fixed terminal structure comprising linear terminals connected to one end of the second cable, and arranged to come into peripheral contact with the peripheral terminals of the rotary terminal structure outside the peripheral terminals, wherein the rotary terminal structure and the fixed terminal structure are coupled to each other such that the linear terminals of the fixed terminal structure corresponding to the peripheral terminals on the rotary terminal structure are in peripheral contact with the peripheral terminals outside the peripheral terminals, respectively, whereby rotary contact is maintained between the peripheral terminals on the rotary terminal structure and the linear terminals on the fixed terminal structure, even during the cable winding operation to wind the first cable, thereby maintaining electrical connection for transmission of electricity or signals between the first and second cables.

In accordance with a third aspect, the present invention provides a contact structure for electrical connection in a cable winding reel comprising:

a first cable connected to a rotating body which rotates during a cable winding operation;

a second cable connected to a fixed body which does not rotate during the cable winding operation;

an inner peripheral terminal structure provided at one of the rotating and fixed bodies, the inner peripheral terminal structure comprising an outer structure body constituting an associated one of the rotating and fixed bodies, and a plurality of terminals arranged on an inner periphery of the outer structure body and connected to one end of an associated one of the first and second cables, the terminals being spaced apart from one another and having one of a pin shape and an annular strip shape; and an outer peripheral terminal structure provided at the other one of the rotating and fixed bodies, the outer peripheral terminal structure comprising an inner structure body constituting an associated one of the rotating and fixed bodies, and a plurality of terminals arranged on an outer periphery of the inner structure body to correspond to the terminals of the inner peripheral terminal structure and connected to one end of an associated one of the first and second cables, the terminals of the outer peripheral terminal structure having the other one of the pin shape and the annular strip shape, wherein the outer and inner structure bodies are coupled to each other such that the inner peripheral structure comes into peripheral contact with the outer peripheral structure outside the outer peripheral structure, whereby rotary contact is maintained between the terminals on the inner peripheral terminal structure and the corresponding terminals on the outer peripheral terminal structure, even during the cable winding operation to wind the first cable, thereby maintaining electrical connection for transmission of electricity or signals between the first and second cables.

In accordance with another aspect of the present invention, the contact structure according to the first aspect of the present invention is applied to a cable winding reel having a spinning reel structure comprising a reel body constituting a skeleton of the reel, a spool shaft mounted to the reel body such that the spool shaft is repeatedly extendable and retractable by an eccentric link mechanism, a spool mounted on the spool shaft, and provided with a cable winding region at an outer periphery of the spool, a rotor rotatably mounted to the reel body, and adapted to wind a first cable guided by a bail around the cable winding region in accordance with a rotating operation of the rotor, and a handle mounted to the reel body via a rotating shaft, and adapted to provide a force for operatively connecting the eccentric link mechanism and the rotor in accordance with an external manipulation to rotate the handle. In one aspect of the present invention, the cable winding reel may further comprise:

the first cable having one end connected to a first device;

a second cable having one end connected to a second device;

a first base plate connected to the other end of one of the first and second cables, and mounted to one of the spool and the spool shaft, the first base plate being provided with a plurality of terminal pins arranged on the first base plate in a protruded state and connected to the other end of the one cable while being spaced apart from a center of the first base plate by different distances, respectively; and a second base plate connected to the other end of the other one of the first and second cables, and mounted to the other one of the spool and the spool shaft, the second base plate being provided with a plurality of annular terminals concentrically arranged on the second base plate and connected to the other end of the other cable, the annular terminals having radii corresponding to the spaced distances of the terminal pins, respectively, wherein the first and second base plates are concentrically arranged about the spool shaft to face each other such that the terminal pins and the corresponding annular terminals come into contact with each other, whereby rotary contact is maintained between the terminal pins on the first base plate mounted to the one of the spool and the spool shaft and the corresponding annular terminals on the second base plate mounted to the other one of the spool and the spool shaft, even during a cable winding operation to wind the first cable around the outer periphery of the spool, thereby maintaining electrical connection between the first and second cables.

In accordance with another aspect of the present invention, the contact structure according to the third aspect of the present invention is applied to the cable winding reel having the spinning reel structure. In one aspect of the present invention, the cable winding reel may further comprise:

the first cable having one end connected to a first device;

a second cable having one end connected to a second device;

an inner peripheral terminal structure arranged at an inner periphery of the spool contacting an outer periphery of the spool shaft, the inner peripheral terminal structure comprising terminal pins connected to the other end of the first cable;

an axial hole formed through the spool shaft to receive the second cable; and an outer peripheral terminal structure arranged at the outer periphery of the spool shaft, the outer peripheral terminal structure comprising annular strip terminals connected to the other end of the second cable, and arranged to correspond to the terminal pins, respectively, whereby rotary contact is maintained between the terminal pins of the inner peripheral terminal structure on the inner periphery of the spool and the corresponding strip terminals of the outer peripheral terminal structure on the outer periphery of the spool shaft, even during a cable winding operation to wind the first cable around the outer periphery of the spool, thereby maintaining electrical connection between the first and second cables.

In the cable winding reel according to this aspect, the inner peripheral terminal structure may not be arranged directly on the inner periphery of the spool. In one aspect of the present invention, the inner peripheral terminal structure may further comprise a slot having a predetermined shape formed in the spool such that the slot extends to the outer peripheral terminal structure; and an insert member which is fitted in the slot and on which the terminal pins connected to the other end of the first cable are arranged to correspond to the strip terminals of the outer peripheral terminal structure, respectively.

In another aspect of the present invention, the cable winding reel having the spinning reel structure, to which the contact structure according to the third aspect of the present invention is applied, may further comprise:

the first cable having one end connected to a first device;

a second cable having one end connected to a second device;

a jack mounted to the other end of the first cable;

an outer peripheral terminal structure arranged at an outer periphery of the jack, the outer peripheral terminal structure comprising annular strip terminals connected to the other end of the first cable;

an axial hole formed through the spool shaft to receive the second cable;

a connector mounted to the other end of the second cable; and an inner peripheral terminal structure arranged at an inner periphery of the connector, the inner peripheral terminal structure comprising terminal pins connected to the other end of the second cable, and arranged to correspond to the strip terminals of the outer peripheral terminal structure, respectively;

whereby rotary contact is maintained between the terminal pins of the inner peripheral terminal structure on the inner periphery of the connector and the corresponding strip terminals of the outer peripheral terminal structure on the outer periphery of the jack, even during a cable winding operation to wind the first cable around the outer periphery of the spool, thereby maintaining electrical connection between the first and second cables.

In accordance with another aspect of the present invention, the contact structure according to the second aspect of the present invention is applied to a cable winding reel having a bait cast reel structure comprising a reel body constituting a skeleton of the reel and having a cavity, a spool received in the cavity of the reel body, and provided with a cable winding region at an outer periphery of the spool to wind a first cable on the cable winding region in accordance with a rotating operation of the spool, and a handle axially mounted to the reel body, and adapted to provide a rotating force to the spool in accordance with an external manipulation to operate the handle. In one aspect of the present invention, the cable winding reel may further comprise:

the first cable having one end connected to a first device;

a second cable having one end connected to a second device;

a rotary terminal structure arranged at one of the spool and the reel body, and connected to the other end of one of the first and second cables, the rotary terminal structure comprising a wheel member mounted to the one of the spool and the reel body, and a plurality of peripheral terminals arranged on an outer periphery of the wheel member, and connected to the other end of the one cable, the peripheral terminals being spaced apart from one another; and a fixed terminal structure arranged at the other one of the spool and the reel body, and connected to the other end of the other one of the first and second cables, the fixed terminal structure comprising linear terminals connected to the other end of the other cable, and arranged to come into peripheral contact with the peripheral terminals outside the peripheral terminals;

wherein the rotary terminal structure and the fixed terminal structure are coupled to each other such that the linear terminals of the fixed terminal structure corresponding to the peripheral terminals on the rotary terminal structure are in peripheral contact with the peripheral terminals outside the peripheral terminals, respectively, whereby rotary contact is maintained between the peripheral terminals of the rotary terminal structure on the one of the spool and the reel body and the linear terminals of the fixed terminal structure on the other one of the spool and the reel body, even during the cable winding operation to wind the first cable, thereby maintaining electrical connection between the first and second cables.

In another aspect of the present invention, the cable winding reel having the bait cast reel structure, to which the contact structure according to the third aspect of the present invention is applied, may further comprise:

the first cable having one end connected to a first device;

a second cable having one end connected to a second device;

an axial hole formed through the spool, the axial hole having a jack fitting hole formed at one end of the axial hole;

a jack mounted to the other end of the second cable, the jack being fitted in the jack fitting hole;

an inner peripheral terminal structure arranged on an inner periphery of the spool at one end of the axial hole, the inner peripheral terminal structure comprising terminal pins connected to the other end of the first cable; and an outer peripheral terminal structure arranged on an outer periphery of the jack, the outer peripheral terminal structure comprising annular strip terminals connected to the other end of the second cable, and arranged to correspond to the terminal pins, respectively, whereby rotary contact is maintained between the terminal pins of the inner peripheral structure on the inner periphery of the spool and the strip terminals of the outer peripheral terminal structure on the outer periphery of the jack, even during the cable winding operation to wind the first cable, thereby maintaining electrical connection between the first and second cables.

In the cable winding reel according to this aspect, the inner peripheral terminal structure may not be arranged directly on the inner periphery of the spool. In one aspect of the present invention, the inner peripheral terminal structure may further comprise a slot having a predetermined shape formed in the spool such that the slot extends to the outer peripheral terminal structure; and an insert member which is fitted in the slot and on which the terminal pins connected to the other end of the first cable are arranged to correspond to the strip terminals of the outer peripheral terminal structure, respectively.

In another aspect of the present invention, the cable winding reel having the bait cast reel structure, to which the contact structure according to the third aspect of the present invention is applied, may further comprise:

the first cable having one end connected to a first device;

a second cable having one end connected to a second device;

a jack mounted to the other end of the first cable;

an outer peripheral terminal structure arranged at an outer periphery of the jack, the outer peripheral terminal structure comprising a plurality of annular strip terminals connected to the other end of the first cable;

an axial hole formed through the spool to receive the second cable;

a connector mounted to the other end of the second cable, the connector being coupled with the jack; and an inner peripheral terminal structure arranged at an inner periphery of the connector, the inner peripheral terminal structure comprising a plurality of terminal pins connected to the other end of the second cable, and arranged to correspond to the strip terminals of the outer peripheral terminal structure, respectively;

whereby rotary contact is maintained between the terminal pins of the inner peripheral terminal structure on the inner periphery of the connector and the corresponding strip terminals of the outer peripheral terminal structure on the outer periphery of the jack, even during a cable winding operation to wind the first cable around the outer periphery of the spool, thereby maintaining electrical connection between the first and second cables.

The devices each connected to one end of the associated first or second cable may be directly connected to the associated cables, or may be indirectly connected to the associated cables via various typical physical connection structures such as typical connectors.

In particular, where the second cable extends through the interior of the reel body, namely, the axial hole of the spool shaft or the axial hole of the spool, the cable winding reel may further comprise a third cable directly or indirectly connected to the second device, a connector mounted to the reel body, and connected to the one end of the second cable, the connector having a jack fitting hole exposed outside the reel body, and a jack mounted to an end of the third cable opposite to the second device, the jack being fitted in the connector. In this case, the second device can be simply connected to or disconnected from the reel by fitting the jack of the third cable connected to the second device in the jack fitting hole of the connector mounted to the reel body or separating the jack from the connector. Accordingly, a great enhancement in use convenience is achieved.

Also, where the second cable extends through the axial hole of the spool shaft, the distance between the end of the second cable fixed to the spool shaft and the end of the second cable fixed to the reel body may be set to be slightly longer than the rectilinear distance required for a maximal extension of the spool shaft, taking into consideration the extending and retracting movement of the spool shaft.

advantageous effects

In accordance with the above-described configurations according to the present invention, it is possible to wind a selected one of the cables each connected, at one end thereof, to an electric/electronic appliance, without causing the selected cable to be twisted, while maintaining a state enabling transmission of electricity and signals between the cables, using a cable winding reel having one of the above-described configurations.

DESCRIPTION OF DRAWINGS

The above and other objects, features and other advantages of the present invention will be more clearly understood from the following detailed description taken in conjunction with the accompanying drawings, in which:

FIG. 1 is an exploded perspective view illustrating a contact structure according to a first embodiment of the present invention;

FIGS. 2 and 3 illustrate a cable winding reel which has the form of a spinning reel, and in which the contact structure according to the first embodiment of the present invention is practically implemented, in which FIG. 2 is an exploded perspective view illustrating the overall structure of the cable winding reel, and FIG. 3 is an enlarged sectional view illustrating the contact structure;

FIGS. 4 and 5 are an exploded perspective view and an assembled perspective view explaining a contact structure according to a second embodiment of the present invention, respectively;

FIG. 6 is an exploded perspective view illustrating a cable winding reel which has the form of a bait cast reel, and in which the contact structure according to the second embodiment of the present invention is practically implemented;

FIGS. 7 and 8 are views explaining a contact structure according to a third embodiment of the present invention, in which FIG. 7 is a front sectional view, and FIG. 8 is a side sectional view;

FIG. 9 is a sectional view illustrating an example of a cable winding reel which has the form of a spinning reel, and in which the contact structure according to the third embodiment of the present invention is implemented;

FIG. 10 is a sectional view illustrating another example of a cable winding reel which has the form of a spinning reel, in which the contact structure according to the third embodiment of the present invention is implemented;

FIGS. 11 and 12 are an enlarged perspective view and an enlarged side sectional view explaining the structure shown in a portion B of FIG. 10, respectively;

FIG. 13 is a sectional view illustrating another example of a cable winding reel which has the form of a spinning reel, and in which the contact structure according to the third embodiment of the present invention is implemented;

FIG. 14 is a sectional view illustrating an example of a cable winding reel which has the form of a bait cast reel, and in which the contact structure according to the third embodiment of the present invention is implemented; and FIG. 15 is a sectional view illustrating another example of a cable winding reel which has the form of a bait cast reel, and in which the contact structure according to the third embodiment of the present invention is implemented.

BEST MODE

Hereinafter, preferred embodiments of the present invention will be described. However, the present invention is not limited to those embodiments.

First Embodiment

FIG. 1 is an exploded perspective view illustrating a contact structure according to a first embodiment of the present invention. The contact structure according the first embodiment, which is applied to a cable winding reel, will be described with reference to FIG. 1.

The contact structure 1A according to this embodiment includes a first base plate 10 and a second base plate 20 which are mounted to a rotating body rotating during a cable winding operation and a fixed body maintained in a fixed state during the cable winding operation, respectively, such that the first and second base plates 10 and 20 face each other. The rotating and fixed bodies are constituent elements of the cable winding reel, respectively. A first cable C1 and a second cable C2, which are disconnected from each other, are connected to the first and second base plates 10 and 20, respectively. The contact structure 1A is also configured to provide a rotary contact between the first and second base plates 10 and 20, in order to electrically connect the first and second cables C1 and C2 for transmission of various signals and electricity, even during rotation of the rotating body.

In the drawing, three terminal pins 11 are arranged in a protruded state on the first base plate 10 while being spaced apart from a center 10a of the first base plate 10 by different distances L1, L2, and L3, respectively. In the illustrated case, each terminal pin 11 is slidably fitted in a hole formed through the first base plate 10. The terminal pins 11 are connected to one-side ends of signal and power lines (not shown) contained in one of the cables, for example, the second cable C2. Three annular terminals 21 are concentrically arranged on the second base plate 20 facing the terminal pins 11. The annular terminals 21 are connected to one-side ends of signal and power lines (not shown) contained in the other cable, for example, the first cable C1. The annular terminals 21 have radii L1, L2, and L3 corresponding to the spaced distances of the terminal pins 11, respectively. Although the number of the terminal pins 11 and the number of annular terminals 21 are three in the case of FIG. 1, they are varied depending on the number of the lines contained in each of the cables C1 and C2 to be connected.

Meanwhile, the first and second base plates 10 and 20 having the above-described configurations are coupled to each other such that their centers 10a and 20a are aligned with each other to cause the corresponding terminal pins 11 and annular terminals 21 to come into contact with each other. The centers 10a and 20a corresponds to the rotation center of the rotating body (not shown). In accordance with this arrangement, when the rotating body rotates through a certain angle to wind the first cable C1, the terminal pins 11 on the first base plate 10 and the corresponding annular terminals 21 on the second base plate 20 are rotated relative to each other while being in contact with each other. As a result, electrical contact is maintained between the terminal pins 11 and the corresponding annular terminals 21. Accordingly, the first and second cables C1 and C2 respectively connected to the terminal pins 11 and annular terminals 21 at one-side ends thereof are electrically connected to each other, so as to transmit and receive various signals and electricity therebetween.

On the other hand, elastic members 12 may be arranged at the rear of the terminal pins 11 arranged on the first base plate 10, to urge the terminal pins 11 against the corresponding annular terminals 21 on the second base plate 20, respectively, as shown in FIG. 1. This structure is preferable because it is possible to maintain close contact between the terminal pins 11 and the corresponding annular terminals 21. It is preferred that the elastic members 12 have a coil spring structure, as shown in FIG. 1. However, springs of other types such as plate springs or an elastic material having intrinsic elasticity, such as rubber or high elastic synthetic resin, may be used.

FIGS. 2 and 3 illustrate a cable winding reel which has the form of a spinning reel, and in which the contact structure according to the first embodiment of the present invention is practically implemented. FIG. 2 is an exploded perspective view illustrating the overall structure of the cable winding reel. FIG. 3 is an enlarged sectional view illustrating the contact structure.

As shown in FIG. 2, the spinning reel 100 according to this embodiment includes a reel body 110 constituting the skeleton of the spinning reel 100, a spool shaft 120 mounted to the reel body 110 such that the spool shaft 120 is repeatedly extendable and retractable by an eccentric link mechanism (not shown), and a spool 130 mounted on the spool shaft 120, and provided with a cable winding region S at the outer periphery of the spool 130. The spinning reel 100 also includes a rotor 140 rotatably mounted to the reel body 110, and adapted to wind a cable guided by a bail 141 around the cable winding region S in accordance with rotation of the rotor 140, and a handle 150 mounted to the reel body 110 via a rotating shaft, and adapted to provide a force for operatively connecting the eccentric link mechanism and the rotor 140 in accordance with external manipulation to operate the handle 150.

In the spinning reel 100 having the above-described configuration, the spool shaft 120 does not rotate during a cable winding operation. Also, normally, the spool 130 does not rotate when the cable is wound in accordance with rotation of the handle 150. However, if necessary, the user can directly rotate the spool 130 about the spool shaft 120 while grasping the spool 130 to wind the cable. In this embodiment, for example, the first cable C1 is bound on the spool 130, which is a rotating body, at an end portion of the first cable C1 at the side of the other end of the first cable C1, and the other end of the first cable C1 is connected to an imaging module (not shown). In this case, also, the second cable C2 is fixed to the spool shaft 120, which is a fixed body, at an end portion of the second cable C2 at the side of the other end of the second cable C2, and the other end of the second cable C2 is connected to a display module (not shown). In order to enable transmission of a signal output from the imaging module to the display module, the contact structure 1A according to the first embodiment of the present invention is provided between the spool 130 and the spool shaft 120 such that the first and second cables C1 and C2 are electrically connected.

Therefore, in accordance with this embodiment, the first base plate 10, on which the terminal pins 11 respectively connected with one-side ends of the lines contained in the second cable C2 are mounted, is mounted on the fixed body, namely, the spool shaft 120. Also, the second base plate 20, on which the annular terminals 21 respectively connected with one-side ends of the lines contained in the first cable C1 are mounted, is mounted on the rotating body, namely, the spool 130.

In accordance with the above-described configuration, even when the spool 130 is rotated through a certain angle by an external force or user's manipulation, contact is maintained between the terminal pins 11 arranged on the first base plate 10 and the corresponding annular terminals 21 arranged on the second base plate 20. Accordingly, the first and second cables C1 and C2 are always electrically connected, so that they enable transmission of signals and electricity therebetween. For example, even during winding of the first cable C1, it is possible to reliably transmit an image signal acquired by the imaging module (not shown) connected to the other end of the first cable C1 to the display module (not shown) connected to the other end of the second cable C2. It is also possible to supply electric power from a battery (not shown) internally provided in the display module connected to the other end of the second cable C2 to the imaging module connected to the other end of the first cable C1. Here, electric/electronic appliances including the imaging module and the like may be directly connected to the other-side ends of the first and second cables C1 and C2. Of course, alternatively, the connection between the electric/ electronic appliances and the ends of the first and second cables C1 and C2 may be achieved through a separate typical connector structure.

In accordance with this embodiment, as shown in FIG. 3, a support plate 13 is also arranged at the rear of the first base plate 10 while being spaced apart from the first base plate 10 by a predetermined distance. The elastic members 12, each of which has the form of a coil spring and which are arranged on ends of the terminal pins 11 opposite to the second base plate 20, are supported by the support plate 13 to urge the terminal pins 11 against the corresponding annular terminals 21, respectively. Accordingly, the terminal pins 11 are always likely to be protruded, so that they are in close contact with the annular terminals 21 arranged on the second base plate 20 while pressing the annular terminals 21.

Second Embodiment

FIGS. 4 and 5 are an exploded perspective view and an assembled perspective view explaining a contact structure according to a second embodiment of the present invention, respectively. The contact structure according the second embodiment, which is applied to a cable winding reel, will be described with reference to FIGS. 4 and 5.

Similarly to the first embodiment, the contact structure 1B of this embodiment applied to a cable winding reel is adapted to maintain electrical connection of signals and electricity between first and second cables C1 and C2 which are disconnected from each other while being connected to selected constituent elements of the cable winding reel, namely, a rotating body rotating during a cable winding operation and a fixed body maintained in a fixed state during the cable winding operation, respectively.

In accordance with this embodiment, however, a rotary terminal structure 30 is provided at the rotating body which rotates during the cable winding operation, as shown in FIGS. 4 and 5. The rotary terminal structure 30 includes a wheel member 30a mounted to the rotating body, and three peripheral terminals 31 arranged on a periphery of the wheel member 30a while being axially spaced apart from one another, and connected to one end of the first cable C. Also, a fixed terminal structure 40 is provided at the fixed body which is maintained in a fixed state during the cable winding operation. The fixed terminal structure 40 includes an L-shaped plate member 40a arranged near the periphery of the wheel member 30a, and three linear terminals 41 arranged on the L-shaped plate member 40a while respectively having one-side ends extending from a lower surface of the L-shaped plate member 40a to come into contact with the peripheral terminals 31 of the rotary terminal structure 30. The other-side ends of the linear terminals 41 are connected to one end of the second cable C2.

Similarly to the first embodiment, the number of the peripheral terminals 31 and the number of linear terminals 41 are varied depending on the numbers of lines contained in the associated cables C1 and C2, respectively.

Meanwhile, the peripheral terminals 31 arranged on the periphery of the wheel member 30a may be directly connected to one end of the cable C1. Also, the other-side ends of the linear terminals 41, which are protruded from the L-shaped plate member 40a, may be directly connected to one end of the cable C2. Of course, alternatively, the connection between the terminals 31 and 41 and the ends of the first and second cables C1 and C2 may be achieved through connectors 32 and 42, as shown in the drawings.

On the other hand, preferably, one-side end of each linear terminal 41 extending from the L-shaped plate member 40a has a C-shaped structure to have an elasticity and to enclose a substantial portion of the associated peripheral terminal 31 on the periphery of the wheel member 30a. Accordingly, each linear terminal 41 is snap-fitted around the periphery of the associated peripheral terminal 31. Thus, in this case, the contact between the linear terminals and the associated peripheral terminals 31 can be more stably maintained in the assembled state as shown in FIG. 6.

FIG. 6 is an exploded perspective view illustrating a cable winding reel which has the form of a bait cast reel, and in which the contact structure according to the second embodiment of the present invention is practically implemented. Hereinafter, a preferred embodiment of the cable winding reel, in which the contact structure according to the second embodiment of the present invention is implemented, will be described with reference to the drawing.

As shown in FIG. 6, the bait cast reel 200 according to this embodiment includes a reel body 210 constituting a fixed body of the bait cast reel 200, which is maintained in a fixed state during a cable winding operation. A cavity 211 is formed in the reel body 210. The bait cast reel 200 also includes a spool 220 received in the cavity 211 of the reel body 210, and provided with a cable winding region S at the periphery of the spool 220, and a handle 230 axially mounted to the reel body 210, and adapted to provide a rotating force to the spool 220. The first cable C1, which is wound around the cable winding region S of the spool 220, is laterally reciprocally fed in accordance with rotation of a feeding shaft 241 mounted to the reel body 210, while being guided by a guide member 240. The guide member 240 is mounted to the reel body 210 in the cavity 211 such that the guide member 240 is parallel to the spool 220.

In this embodiment, the reel body 210, which does not rotate during the cable winding operation, and the spool 220, which rotates during the cable winding operation, function as a fixed body and a rotating body, respectively, to implement the contact structure 1B according to the second embodiment of the present invention in the bait cast reel 200 having the above-described configuration, for transmission of signals and electricity between the first cable C1 wound around the spool 220 and the second cable C2 maintained in a fixed state.

That is, the rotary terminal structure 30 is mounted to one side of the rotating body, namely, the spool 220. As described above, in the rotary terminal structure 30, the peripheral terminals 31 are arranged on the periphery of the wheel member 30a while being spaced apart from one another, and are connected to one end of the first cable C1. Also, the fixed terminal structure 40 is mounted to the fixed body, namely, the reel body 210. As described above, in the fixed terminal structure 40, the linear terminals 41 have one-side ends extending from the L-shaped plate member 40a, and the other-side ends connected to one end of the second cable C2.

The mounting of the rotary terminal structure 30 and fixed terminal structure 40 are achieved such that the linear terminals 41 of the fixed terminal structure 40 are in peripheral contact with the peripheral terminals 31 of the rotary terminal structure 30. In the illustrated case, since each linear terminal 41 has a C-shaped structure to substantially enclose the associated peripheral terminal 31, stable contact is maintained between the linear contacts 41 and the corresponding peripheral terminals 31.

In accordance with this configuration, even when the spool 220 is continuously rotated in accordance with operation of the handle 230, the peripheral terminals 31 of the rotary terminal structure 30 and the linear terminals 41 of the fixed terminal structure 40 are maintained in a connected state. Accordingly, stable electrical connection for signals and electricity is maintained between the first and second cables C1 and C2.

Third Embodiment

FIGS. 7 and 8 are views explaining a contact structure according to a third embodiment of the present invention. FIG. 7 is a front sectional view, and FIG. 8 is a side sectional view. The contact structure according the third embodiment, which is applied to a cable winding reel, will be described with reference to FIGS. 7 and 8.

The contact structure 1C according to this embodiment includes an outer cylindrical structure body 50a, and an inner cylindrical structure body 60a extending through the outer cylindrical structure body 50a such that the inner periphery of the outer structure body 50a and the outer periphery of the inner structure body 60a are positioned proximally to each other. When the contact structure 1C is applied to a cable winding reel, the outer structure body 50a constitutes one constituent element of the cable winding reel, namely, a rotating body rotating during a cable winding operation. In this case, the inner structure body 60a constitutes another constituent element of the cable winding reel, namely, a fixed body maintained in a fixed state during the cable winding operation. An outer peripheral terminal structure 60 is formed on the outer periphery of the inner structure body 60a, and an inner peripheral terminal structure 50 is formed on the inner periphery of the outer structure body 50a. A first cable C1 and a second cable C2 are connected, at one-side ends thereof, to the inner and outer peripheral terminal structures 50 and 60, respectively. In accordance with this configuration, rotary contact is maintained between the inner and outer peripheral terminal structures 50 and 60 to electrically connect the first and second cables C1 and C2 for transmission of various signals and electricity even during rotation of the rotating body.

For such rotary contact, as shown in FIGS. 7 and 8, the inner peripheral terminal structure 50 includes a plurality of terminal pins 51 arranged on the cylindrical inner periphery of the outer structure body 50a while being axially spaced apart from one another, and connected to one-side ends of signal and power lines contained in the cable C1. Also, the outer peripheral terminal structure 60 includes a plurality of annular strip terminals 61 arranged around the cylindrical outer periphery of the inner structure body 60a while being axially spaced apart from one another, and connected to one-side ends of signal and power lines contained in the cable C2.

Contrary to the illustrated case, the terminal pins 51 may be arranged on the outer periphery of the inner structure body 60a, and the annular strip terminals 61 may be arranged around the inner periphery of the outer structure body 50a. In the case of FIGS. 7 and 8, the inner peripheral terminal structure 50 includes four terminal pins 51, and the outer peripheral terminal structure 60 includes four annular strip terminals 61 respectively corresponding to the terminal pins 51. In order to couple the inner and outer peripheral terminal structures 50 and 60 having the above-described configurations, the inner structure body 60a, the periphery of which has a cylindrical shape, extends through a cylindrical hole centrally formed through the outer structure body 60a such that the strip terminals or terminal pins on the inner peripheral terminal structure 50 are in contact with the corresponding terminal pins or strip terminals on the outer peripheral terminal structure 60, respectively.

Contrary to the above description, the outer structure body 50a may constitute the fixed body, and the inner structure body 60a may constitute the rotating body.

In accordance with the above-described contact structure 1C, even when the rotating body constituted by, for example, the outer structure body 50a, rotates in an arrow direction in FIG. 8 to wind the first cable C1 connected to the rotating body, rotary contact is maintained between the terminal pins 51 and the corresponding strip terminals 61 as the terminal pins 51 slide along the peripheries of the strip terminals 61, respectively. Accordingly, the first and second cables C1 and C2 are continuously electrically connected, so that stable transmission of signals and electricity between the first and second cables C1 and C2 can be achieved.

FIGS. 9 to 13 illustrate a cable winding reel which has the form of a spinning reel, and in which the contact structure according to the third embodiment of the present invention is practically implemented. Preferred embodiments of the cable winding reel, which is equipped with the contact structure according to the third embodiment of the present invention, will be described with reference to the drawings.

FIG. 9 is a sectional view illustrating a first embodiment of the spinning reel 300. The spinning reel 300 according to this embodiment mainly includes a reel body 310 constituting the skeleton of the spinning reel 300, a spool shaft 320 mounted to the reel body 310 such that the spool shaft 320 is repeatedly extendable and retractable by an eccentric link mechanism 311, and a spool 330 mounted on the spool shaft 320, and provided with a cable winding region S at the periphery of the spool 330. The spinning reel 300 also includes a rotor 340 rotatably mounted to the reel body 310, and adapted to wind a cable guided by a bail 341 around the cable winding region S in accordance with rotation of the rotor 340, and a handle 350 mounted to the reel body 310 via a rotating shaft 350a, and adapted to provide a force for operatively connecting the eccentric link mechanism 311 and the rotor 340 in accordance with external manipulation to operate the handle 350.

As shown in the drawing, the eccentric link mechanism 311 and the rotating shaft or handle shaft 350a are connected through meshing of spur gears, and the rotor 340 and handle shaft 350a are connected through meshing of helical gears. With such meshing structures, force applied to the handle 350 is transmitted to the eccentric link mechanism 311 and rotor 340. A drag knob 360 is mounted to an end of the spool shaft 320 at the side of the spool 330, in order to prevent the spool 330 from being separated from the spool shaft 320.

In accordance with this embodiment, the spool shaft 320 has a hollow tube structure in which an axial hole 320a is formed. A second cable C2 extends through the axial hole 320a of the spool shaft 320. A connector 62 is mounted to one end of the second cable C2. The one end of the second cable C2 extends beyond the spool shaft 320 so that the second cable C2 has an exposed portion C2a. The exposed portion C2a of the second cable C2 is fixedly mounted to the reel body 310 in a state in which the connector 62 is exposed outside the reel body 310. The exposed connector 62 is connected to a jack 63 provided at one end of a third cable C2'◎ directly connected to, for example, a display module (not shown), so that the second cable C2 is connected to the third cable C2'.

Meanwhile, the other end of the second cable C2 extends through the axial hole 320a of the spool shaft 320 to a spool region where the spool 330 is arranged. At the spool region, the other end of the second cable C2 extends radially outwardly through the spool shaft 320, so as to connect one-side ends of power and signal lines contained in the second cable C2 to strip terminals 61 arranged on the outer periphery of the spool shaft 320 surrounded by the spool 330, respectively. Thus, an outer peripheral terminal structure 60 is formed. Also, terminal pins 51 are arranged on the inner surface of the spool 330 at regions corresponding to the strip terminals 61, respectively. One-side ends of signal and power lines contained in a first cable C1 are connected to the terminal pins 51, respectively. Thus, an inner peripheral terminal structure 50 is formed.

With this configuration, although a rotating force is applied to one end of the first cable C1 during a cable winding operation to wind the first cable C1 around the outer surface of the spool 330 in a state in which the spool shaft 320 extends through the spool 330, the terminal pins 51 of the inner peripheral terminal structure 50 on the inner surface of the spool 330 slide along the corresponding strip terminals 61 of the outer peripheral terminal structure 60 on the outer surface of the spool shaft 320 while being in contact with the corresponding strip terminals 61. Accordingly, connection is maintained between the inner peripheral terminal structure 50 and the outer peripheral terminal structure 60, so that electrical connection between the first cable C1 and the second cable C2 is maintained. Accordingly, it is possible to transmit signals and electricity between external electric/electronic appliances directly or indirectly connected to the cables C1 and C2.

Meanwhile, when the spinning reel 300 performs a winding operation in accordance with rotation of the handle 350, the spool shaft 320 is reciprocally moved in an axial direction by a predetermined distance. In order to avoid breakage of the cable caused by the reciprocal movement of the spool shaft 320, the exposed portion C2a of the second cable C2 emerging from the spool shaft 320 is slightly longer than the axial movement length of the spool shaft 320. Accordingly, even when the spool shaft 320 extends maximally, the second cable C2 is not tensed, so that the connection between the connector 62 and the jack 63 is not released.

FIG. 10 illustrates a slightly modified embodiment of the first embodiment.

The spinning reel 300'⊙ shown in FIG. 10 is substantially identical to the spinning reel 300 according to the first embodiment. In this embodiment, however, the spinning reel 300' includes a spool 330'⊙ formed with a slot, and an insert member 52 mounted to one end of the first cable C1 and fitted in the slot to constitute an inner peripheral terminal structure 50'⊙ which will be arranged at the inner surface of the spool 330'.

Hereinafter, this configuration will be described in more detail with reference to FIGS. 11 and 12 illustrating a portion B of FIG. 10 through an enlarged perspective view and an enlarged side sectional view.

As shown in the drawings, a slot 331 is formed in the spool 330'⊙ such that the strip terminals 61 of the outer peripheral terminal structure 60 formed on the spool shaft 320, as in the first embodiment, are outwardly exposed through the slot 331. The insert member 52 is fitted in the slot 331. To constitute the inner peripheral terminal structure 50' terminal pins 51' to which one-side ends of lines contained in the first cable C1 are connected, are mounted in the insert member 52 such that the terminal pins 51' are protruded from the insert member 52 at positions corresponding to the strip terminals 61, respectively. Accordingly, contact is maintained between the outer peripheral terminal structure 60 and the inner peripheral terminal structure 50⊙ in a state in which the insert member 52 is fitted in the slot. Thus, electrical connection is maintained between the second cable C2, one end of which is connected to the strip terminals 61, and the first cable C1, one end of which is connected to the terminal pins 51' during the operation to wind the first cable C1, so that it is possible to stably transmit electricity and signals between the first and second cables C1 and C2.

FIG. 13 illustrates another slightly modified embodiment of the first embodiment. The spinning reel 300" according to this embodiment is substantially identical to the spinning reel 300 according to the first embodiment.

In this embodiment, however, an axial hole 320a is formed through the spool shaft 320. The second cable C2 extends through the axial hole 320a. Connectors 62 and 64 are attached to opposite ends of the second cable C2, respectively. Each of the connectors 62 and 64 has a jack fitting hole exposed outwardly, as shown in the drawing. In this embodiment, the connection between the first and second cables C1 and C2 is achieved by fitting jacks 63 and 65 fixed to one-side ends of the first and third cables C1 and C2' in the jack fitting holes of the connectors 62 and 64.

In this embodiment, an inner peripheral terminal structure 50"⊙ is provided at the connector 64 to be connected to the first cable C1 wound around the outer periphery of the spool 330. The inner peripheral terminal structure 50"⊙ includes terminal pins connected to one end of the second cable C2, and arranged on the inner periphery of the connector 64. Also, an outer peripheral terminal structure 60"⊙ is arranged at the jack 65 connected to one end of the first cable C1. The outer peripheral terminal structure 60" includes strip terminals 61 arranged on the outer periphery of the jack 65 at positions corresponding to the terminal pins. With this configuration, rotary contact is maintained between the terminal pins of the inner peripheral terminal structure 50"⊙ and the strip terminals of the outer peripheral terminal structure 60"⊙ even during the operation to wind the first cable C1 in accordance with rotation of the spool 330. Accordingly, electrical connection is maintained between the first and second cables C1 and C2, so that it is possible to stably transmit electricity and signals between electric/electronic appliances connected to the other-side ends of the first and second cables C1 and C2.

FIGS. 14 and 15 illustrate cable winding reels which have the form of a bait cast reel, and in which the contact structure according to the third embodiment of the present invention is practically implemented, respectively. Hereinafter, other embodiments of the cable winding reel, in which the contact structure according to the third embodiment of the present invention is implemented, will be described with reference to the drawings.

FIG. 14 illustrates the cross-sectional structure of a bait cast reel 400 according to a first embodiment. The bait cast reel 400 according to this embodiment includes a reel body 410 constituting the skeleton of the bait cast reel 400. A cavity 411 is formed in the reel body 410. The bait cast reel 400 also includes a spool 420 received in the cavity 411 of the reel body 410, and provided with a cable winding region S at an outer periphery of the spool 420 to wind a cable on the cable winding region S in accordance with rotation of the spool 420. A handle 430 is axially mounted to the reel body 410 to provide a rotating force to the spool 420 in accordance with external manipulation to operate the handle 430.

A first cable C1, which is wound around the cable winding region S of the spool 420, is laterally reciprocally fed in accordance with rotation of a feeding shaft 441 mounted to the reel body 410, while being guided by a guide member 440. The guide member 440 is mounted to the reel body 410 in the cavity 411 such that the guide member 440 is parallel to the spool 420.

Generally, in the bait cast reel 400 having the above-described configuration, the spool 420, handle 430, and feeding shaft 441 are operatively connected through meshing of a gearing 450 arranged at one side of the reel body 410.

In accordance with this embodiment, an axial hole 420a extends axially through the spool 420. Four terminal pins 51 are arranged on an inner periphery of the spool 420 at one end of the axial hole 420a such that they are exposed to the axial hole 420a. The terminal pins 51 are connected to one-side ends of lines contained in the first cable C1. Thus, the terminal pins 51 constitute an inner peripheral terminal structure 50. A jack fitting hole 410a is formed at a portion of the reel body 410 adjacent to the one end of the axial hole 420a. A cylindrical jack 65, which is connected to one end of a second cable C2, is fitted in the jack fitting hole 410a. An outer peripheral terminal structure 60''' is arranged on the periphery of the jack 65. The outer peripheral terminal structure 60''' includes strip terminals respectively corresponding to the terminal pins 51 of the inner peripheral terminal structure 50.

In the bait cast reel 400 according to this embodiment, accordingly, rotary contact is maintained between the inner peripheral terminal structure 50 arranged on the inner periphery of the spool 420 and connected with one end of the first cable C1 and the outer peripheral terminal structure 60''' arranged on the jack 65 mounted to one end of the second cable C2, even during the operation to wind the first cable C1 on the spool 420 in accordance with rotation of the spool 420. Thus, electrical connection is maintained between the first and second cables C1 and C2, so that it is possible to stably transmit electricity and signals between the first and second cables C1 and C2.

FIG. 15 illustrates a slightly modified embodiment of the first embodiment. The bait cast reel 400'⊚ of this embodiment is substantially identical to the bait cast reel 400 of the first embodiment.

In this embodiment, however, an axial hole 420a is formed through the spool 420. A second cable C2 extends through the axial hole 420a. Connectors 62 and 64 are attached to opposite ends of the second cable C2, respectively. The connectors 62 and 64 are connected with jacks 63 and 65 fixed to one-side ends of first and third cables C1 and C2'⊚ for inputting and outputting of electricity and signals, respectively.

Since the first cable C1 may be twisted as it is wound around the spool 420, rotary contact must be maintained between the first and second cables C1 and C2 in order to prevent the first cable C1 from being twisted. To this end, an inner peripheral terminal structure 50'''' and an outer peripheral terminal structure 60'''' are provided. The inner peripheral terminal structure 50'''' is arranged on the inner periphery of the connector 64 to be connected to the first cable C1. The inner peripheral terminal structure 50'''' includes terminal pins connected to one end of the second cable C2, and arranged on the inner periphery of the connector 64. The outer peripheral terminal structure 60'''' is arranged at the jack 65 connected to one end of the first cable C1. The outer peripheral terminal structure 60'''' includes strip terminals connected to one end of the first cable C1, and arranged on the outer periphery of the jack 65 at positions corresponding to the terminal pins. With this configuration, rotary contact is maintained between the terminal pins of the inner peripheral terminal structure 50'''' and the strip terminals of the outer peripheral terminal structure 60'''' even during the operation to wind the first cable C1 in accordance with rotation of the spool 420. Accordingly, electrical connection is maintained between the first and second cables C1 and C2, so that it is possible to stably transmit electricity and signals between electric/electronic appliances connected to the other-side ends of the first and second cables C1 and C2.

INDUSTRIAL APPLICABILITY

As apparent from the above description, the cable winding reel equipped with the contact structure of the present invention can wind a cable while maintaining an electrical connection state enabling stable transmission of various signals and electricity through the cable without causing the cable to be twisted. Accordingly, where the cable winding reel uses a cable (multi-function cable) connected, at one end thereof, to a weight internally provided with an underwater camera, and connected, at the other end thereof, to a display module adapted to display an image picked up by the underwater camera, under the condition in which the cable is attached, as a fishing line, to a fishing rod, the user can fish while winding or unwinding the cable, as in typical fishing.

In addition to such fishing equipment, the present invention is applicable to various equipment used for an imaging or measuring operation to be carried out at a place where it is difficult for the operator to perform desired observation, as in the underwater or underground, in order to provide a contact structure for electrical connection between cables respectively connected to a rotating body and a fixed body, as in, for example, a winding reel for winding a cable adapted to connect a device to penetrate into the under water or underground and a device externally used for a monitoring or control operation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A contact structure for electrical connection in a cable winding reel comprising:
    a first cable connected to a rotating body which rotates during a cable winding operation;
    a second cable connected to a fixed body which does not rotate during the cable winding operation;
    a first base plate mounted to one of the rotating and fixed bodies, and provided with a plurality of terminal pins arranged on the first base plate and connected to one end of an associated one of the first and second cables, the terminal pins being spaced apart from a center of the first base plate by different distances, respectively; and
    a second base plate mounted to the other one of the rotating and fixed bodies, and provided with a plurality of annular terminals concentrically arranged on the second base plate and connected to one end of an associated one of the first and second cables, the annular terminals having radii corresponding to the spaced distances of the terminal pins, respectively,
    wherein the first and second base plates are concentrically arranged to face each other such that the terminal pins and the corresponding annular terminals come into contact with each other,
    whereby rotary contact is maintained between the terminal pins on the first base plate and the corresponding annular terminals on the second base plate, even during the cable winding operation to wind the first cable, thereby maintaining electrical connection for transmission of electricity or signals between the first and second cables.

2. The contact structure as set forth in claim 1, further comprising:

elastic members arranged at the rear of the terminal pins arranged on the first base plate, and adapted to urge the terminal pins against the second base plate, respectively, such that close contact is maintained between the terminal pins on the first base plate and the corresponding annular terminals on the second base plate.

3. A contact structure for electrical connection in a cable winding reel comprising:

a first cable connected to a rotating body which rotates during a cable winding operation;

a second cable connected to a fixed body which does not rotate during the cable winding operation;

a rotary terminal structure provided at the rotating body, the rotary terminal structure comprising a wheel member mounted to the rotating body, and a plurality of peripheral terminals arranged on a periphery of the wheel member while being spaced apart from one another, the peripheral terminals being connected to one end of the first cable; and a fixed terminal structure provided at the fixed body, the fixed terminal structure comprising linear terminals connected to one end of the second cable, and arranged to come into peripheral contact with the peripheral terminals of the rotary terminal structure outside the peripheral terminals, wherein the rotary terminal structure and the fixed terminal structure are coupled to each other such that the linear terminals of the fixed terminal structure corresponding to the peripheral terminals on the rotary terminal structure are in peripheral contact with the peripheral terminals outside the peripheral terminals, respectively, whereby rotary contact is maintained between the peripheral terminals on the rotary terminal structure and the linear terminals on the fixed terminal structure, even during the cable winding operation to wind the first cable, thereby maintaining electrical connection for transmission of electricity or signals between the first and second cables.

4. The contact structure as set forth in claim 3, wherein each of the linear terminals has a C-shaped structure to have an elasticity and to enclose a substantial portion of the corresponding peripheral terminal such that the linear terminal is snap-fitted around a periphery of the corresponding peripheral terminal.

5. A contact structure for electrical connection in a cable winding reel comprising:

a first cable connected to a rotating body which rotates during a cable winding operation;

a second cable connected to a fixed body which does not rotate during the cable winding operation;

an inner peripheral terminal structure provided at one of the rotating and fixed bodies, the inner peripheral terminal structure comprising an outer structure body constituting an associated one of the rotating and fixed bodies, and a plurality of terminals arranged on an inner periphery of the outer structure body and connected to one end of an associated one of the first and second cables, the terminals being spaced apart from one another and having one of a pin shape and an annular strip shape; and an outer peripheral terminal structure provided at the other one of the rotating and fixed bodies, the outer peripheral terminal structure comprising an inner structure body constituting an associated one of the rotating and fixed bodies, and a plurality of terminals arranged on an outer periphery of the inner structure body to correspond to the terminals of the inner peripheral terminal structure and connected to one end of an associated one of the first and second cables, the terminals of the outer peripheral terminal structure having the other one of the pin shape and the annular strip shape, wherein the outer and inner structure bodies are coupled to each other such that the inner peripheral structure comes into peripheral contact with the outer peripheral structure outside the outer peripheral structure, whereby rotary contact is maintained between the terminals on the inner peripheral terminal structure and the corresponding terminals on the outer peripheral terminal structure, even during the cable winding operation to wind the first cable, thereby maintaining electrical connection for transmission of electricity or signals between the first and second cables.

6. A cable winding reel having a spinning reel structure comprising a reel body constituting a skeleton of the reel, a spool shaft mounted to the reel body such that the spool shaft is repeatedly extendable and retractable by an eccentric link mechanism, a spool mounted on the spool shaft, and provided with a cable winding region at an outer periphery of the spool, a rotor rotatably mounted to the reel body, and adapted to wind a first cable guided by a bail around the cable winding region in accordance with a rotating operation of the rotor, and a handle mounted to the reel body via a rotating shaft, and adapted to provide a force for operatively connecting the eccentric link mechanism and the rotor in accordance with an external manipulation to rotate the handle, further comprising:

the first cable having one end connected to a first device;

a second cable having one end connected to a second device;

a first base plate connected to the other end of one of the first and second cables, and mounted to one of the spool and the spool shaft, the first base plate being provided with a plurality of terminal pins arranged on the first base plate in a protruded state and connected to the other end of the one cable while being spaced apart from a center of the first base plate by different distances, respectively; and a second base plate connected to the other end of the other one of the first and second cables, and mounted to the other one of the spool and the spool shaft, the second base plate being provided with a plurality of annular terminals concentrically arranged on the second base plate and connected to the other end of the other cable, the annular terminals having radii corresponding to the spaced distances of the terminal pins, respectively, wherein the first and second base plates are concentrically arranged about the spool shaft to face each other such that the terminal pins and the corresponding annular terminals come into contact with each other, whereby rotary contact is maintained between the terminal pins on the first base plate mounted to the one of the spool and the spool shaft and the corresponding annular terminals on the second base plate mounted to the other one of the spool and the spool shaft, even during a cable winding operation to wind the first cable around the outer periphery of the spool, thereby maintaining electrical connection between the first and second cables.

7. The cable winding reel as set forth in claim 6, further comprising:
a support plate arranged at the rear of the first base plate to be spaced apart from the first base plate; and
elastic members arranged on the support plate, and adapted to urge the terminal pins against the second base plate, respectively, such that close contact is maintained between the terminal pins and the corresponding annular terminals.

8. The cable winding reel as set forth in claim 7, further comprising:
a third cable directly or indirectly connected to the second device;
a connector mounted to the reel body, and connected to the one end of the second cable, the connector having a jack fitting hole exposed outside the reel body; and
a jack mounted to an end of the third cable opposite to the second device, the jack being fitted in the connector.

9. The cable winding reel as set forth in claim 6, further comprising:
a third cable directly or indirectly connected to the second device;
a connector mounted to the reel body, and connected to the one end of the second cable, the connector having a jack fitting hole exposed outside the reel body; and
a jack mounted to an end of the third cable opposite to the second device, the jack being fitted in the connector.

10. A cable winding reel having a spinning reel structure comprising a reel body constituting a skeleton of the reel, a spool shaft mounted to the reel body such that the spool shaft is repeatedly extendable and retractable by an eccentric link mechanism, a spool mounted on the spool shaft, and provided with a cable winding region at an outer periphery of the spool, a rotor rotatably mounted to the reel body, and adapted to wind a first cable guided by a bail around the cable winding region in accordance with a rotating operation of the rotor, and a handle mounted to the reel body via a rotating shaft, and adapted to provide a force for operatively connecting the eccentric link mechanism and the rotor in accordance with an external manipulation to rotate the handle, further comprising:
the first cable having one end connected to a first device;
a second cable having one end connected to a second device;
an inner peripheral terminal structure arranged at an inner periphery of the spool contacting an outer periphery of the spool shaft, the inner peripheral terminal structure comprising terminal pins connected to the other end of the first cable;
an axial hole formed through the spool shaft to receive the second cable; and
an outer peripheral terminal structure arranged at the outer periphery of the spool shaft, the outer peripheral terminal structure comprising annular strip terminals connected to the other end of the second cable, and arranged to correspond to the terminal pins, respectively,
whereby rotary contact is maintained between the terminal pins of the inner peripheral terminal structure on the inner periphery of the spool and the corresponding strip terminals of the outer peripheral terminal structure on the outer periphery of the spool shaft, even during a cable winding operation to wind the first cable around the outer periphery of the spool, thereby maintaining electrical connection between the first and second cables.

11. The cable winding reel as set forth in claim 10, wherein the inner peripheral terminal structure further comprises:
a slot having a predetermined shape formed in the spool such that the slot extends to the outer peripheral terminal structure; and
an insert member which is fitted in the slot and on which the terminal pins connected to the other end of the first cable are arranged to correspond to the strip terminals of the outer peripheral terminal structure, respectively.

12. The cable winding reel as set forth in claim 10, further comprising:
a third cable directly or indirectly connected to the second device;
a connector mounted to the reel body, and connected to the one end of the second cable, the connector having a jack fitting hole exposed outside the reel body; and
a jack mounted to an end of the third cable opposite to the second device, the jack being fitted in the connector.

13. A cable winding reel having a spinning reel structure comprising a reel body constituting a skeleton of the reel, a spool shaft mounted to the reel body such that the spool shaft is repeatedly extendable and retractable by an eccentric link mechanism, a spool mounted on the spool shaft, and provided with a cable winding region at an outer periphery of the spool, a rotor rotatably mounted to the reel body, and adapted to wind a first cable guided by a bail around the cable winding region in accordance with a rotating operation of the rotor, and a handle mounted to the reel body via a rotating shaft, and adapted to provide a force for operatively connecting the eccentric link mechanism and the rotor in accordance with an external manipulation to rotate the handle, further comprising:
the first cable having one end connected to a first device;
a second cable having one end connected to a second device;
a jack mounted to the other end of the first cable;
an outer peripheral terminal structure arranged at an outer periphery of the jack, the outer peripheral terminal structure comprising annular strip terminals connected to the other end of the first cable;
an axial hole formed through the spool shaft to receive the second cable;
a connector mounted to the other end of the second cable; and
an inner peripheral terminal structure arranged at an inner periphery of the connector, the inner peripheral terminal structure comprising terminal pins connected to the other end of the second cable, and arranged to correspond to the strip terminals of the outer peripheral terminal structure, respectively;
whereby rotary contact is maintained between the terminal pins of the inner peripheral terminal structure on the inner periphery of the connector and the corresponding strip terminals of the outer peripheral terminal structure on the outer periphery of the jack, even during a cable winding operation to wind the first cable around the outer periphery of the spool, thereby maintaining electrical connection between the first and second cables.

14. The cable winding reel as set forth in claim 13, further comprising:
a third cable directly or indirectly connected to the second device;
a connector mounted to the reel body, and connected to the one end of the second cable, the connector having a jack fitting hole exposed outside the reel body; and
a jack mounted to an end of the third cable opposite to the second device, the jack being fitted in the connector.

15. A cable winding reel having a bait cast reel structure comprising a reel body constituting a skeleton of the reel and having a cavity, a spool received in the cavity of the reel body, and provided with a cable winding region at an outer periphery of the spool to wind a first cable on the cable winding region in accordance with a rotating operation of the spool, and a handle axially mounted to the reel body, and adapted to provide a rotating force to the spool in accordance with an external manipulation to operate the handle, further comprising:

the first cable having one end connected to a first device;

a second cable having one end connected to a second device;

a rotary terminal structure arranged at one of the spool and the reel body, and connected to the other end of one of the first and second cables, the rotary terminal structure comprising a wheel member mounted to the one of the spool and the reel body, and a plurality of peripheral terminals arranged on an outer periphery of the wheel member, and connected to the other end of the one cable, the peripheral terminals being spaced apart from one another; and a fixed terminal structure arranged at the other one of the spool and the reel body, and connected to the other end of the other one of the first and second cables, the fixed terminal structure comprising linear terminals connected to the other end of the other cable, and arranged to come into peripheral contact with the peripheral terminals outside the peripheral terminals;

wherein the rotary terminal structure and the fixed terminal structure are coupled to each other such that the linear terminals of the fixed terminal structure corresponding to the peripheral terminals on the rotary terminal structure are in peripheral contact with the peripheral terminals outside the peripheral terminals, respectively, whereby rotary contact is maintained between the peripheral terminals of the rotary terminal structure on the one of the spool and the reel body and the linear terminals of the fixed terminal structure on the other one of the spool and the reel body, even during the cable winding operation to wind the first cable, thereby maintaining electrical connection between the first and second cables.

16. A cable winding reel having a bait cast reel structure comprising a reel body constituting a skeleton of the reel and having a cavity, a spool received in the cavity of the reel body, and provided with a cable winding region at an outer periphery of the spool to wind a first cable on the cable winding region in accordance with a rotating operation of the spool, and a handle axially mounted to the reel body, and adapted to provide a rotating force to the spool in accordance with an external manipulation to operate the handle, further comprising:

the first cable having one end connected to a first device;

a second cable having one end connected to a second device;

an axial hole formed through the spool, the axial hole having a jack fitting hole formed at one end of the axial hole;

a jack mounted to the other end of the second cable, the jack being fitted in the jack fitting hole;

an inner peripheral terminal structure arranged on an inner periphery of the spool at one end of the axial hole, the inner peripheral terminal structure comprising terminal pins connected to the other end of the first cable; and an outer peripheral terminal structure arranged on an outer periphery of the jack, the outer peripheral terminal structure comprising annular strip terminals connected to the other end of the second cable, and arranged to correspond to the terminal pins, respectively, whereby rotary contact is maintained between the terminal pins of the inner peripheral structure on the inner periphery of the spool and the strip terminals of the outer peripheral terminal structure on the outer periphery of the jack, even during the cable winding operation to wind the first cable, thereby maintaining electrical connection between the first and second cables.

17. The cable winding reel as set forth in claim 16, wherein the inner peripheral terminal structure further comprises:

a slot having a predetermined shape formed in the spool such that the slot extends to the outer peripheral terminal structure; and an insert member which is fitted in the slot and on which the terminal pins connected to the other end of the first cable are arranged to correspond to the strip terminals of the outer peripheral terminal structure, respectively.

18. A cable winding reel having a bait cast reel structure comprising a reel body constituting a skeleton of the reel and having a cavity, a spool received in the cavity of the reel body, and provided with a cable winding region at an outer periphery of the spool to wind a first cable on the cable winding region in accordance with a rotating operation of the spool, and a handle axially mounted to the reel body, and adapted to provide a rotating force to the spool in accordance with an external manipulation to operate the handle, further comprising:

the first cable having one end connected to a first device;

a second cable having one end connected to a second device;

a jack mounted to the other end of the first cable;

an outer peripheral terminal structure arranged at an outer periphery of the jack, the outer peripheral terminal structure comprising a plurality of annular strip terminals connected to the other end of the first cable;

an axial hole formed through the spool to receive the second cable;

a connector mounted to the other end of the second cable, the connector being coupled with the jack; and an inner peripheral terminal structure arranged at an inner periphery of the connector, the inner peripheral terminal structure comprising a plurality of terminal pins connected to the other end of the second cable, and arranged to correspond to the strip terminals of the outer peripheral terminal structure, respectively;

whereby rotary contact is maintained between the terminal pins of the inner peripheral terminal structure on the inner periphery of the connector and the corresponding strip terminals of the outer peripheral terminal structure on the outer periphery of the jack, even during a cable winding operation to wind the first cable around the outer periphery of the spool, thereby maintaining electrical connection between the first and second cables.

19. The cable winding reel as set forth in claim 18, further comprising:

a third cable directly or indirectly connected to the second device;

a connector mounted to the reel body, and connected to the one end of the second cable, the connector having a jack fitting hole exposed outside the reel body; and a jack mounted to an end of the third cable opposite to the second device, the jack being fitted in the connector.

* * * * *